(12) United States Patent
Harris et al.

(10) Patent No.: US 11,014,849 B2
(45) Date of Patent: May 25, 2021

(54) SYSTEMS AND METHODS FOR ION EXCHANGING GLASS ARTICLES

(71) Applicant: CORNING INCORPORATED, Corning, NY (US)

(72) Inventors: Michael David Harris, Littleton, CO (US); Timothy Leonard Hunt, Wilmington, NC (US); Kevin Robert Kaelin, Pine City, NY (US); William James Miller, Horseheads, NY (US); Patrick Aaron Parks, Elmira, NY (US); Jeanne Lynn Swecker, Kennebunk, ME (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 595 days.

(21) Appl. No.: 15/824,582

(22) Filed: Nov. 28, 2017

(65) Prior Publication Data

US 2018/0148373 A1 May 31, 2018

Related U.S. Application Data

(60) Provisional application No. 62/428,016, filed on Nov. 30, 2016.

(51) Int. Cl.
*C03C 21/00* (2006.01)
*B08B 9/42* (2006.01)
*C03C 23/00* (2006.01)

(52) U.S. Cl.
CPC .............. *C03C 21/002* (2013.01); *B08B 9/42* (2013.01); *C03C 23/0075* (2013.01)

(58) Field of Classification Search
CPC ...... C03C 21/002; C03C 23/0075; B08B 9/42
See application file for complete search history.

(56) References Cited

U.S. PATENT DOCUMENTS

| | | |
|---|---|---|
| 3,590,982 A | 7/1971 | Banyas |
| 3,938,977 A | 2/1976 | Gliemeroth |
| 6,534,120 B1 * | 3/2003 | Ozawa ................. C03C 21/002 427/127 |
| 8,980,777 B2 | 3/2015 | Danielson et al. |
| | (Continued) | |

FOREIGN PATENT DOCUMENTS

| | | |
|---|---|---|
| WO | 2011149812 A1 | 12/2011 |
| WO | 2013130649 A1 | 9/2013 |

OTHER PUBLICATIONS

International Search Report & Written Opinion dated Mar. 16, 2018, for PCT/US2017/063803 filed Nov. 29, 2017. pp. 1-12.

*Primary Examiner* — Nahida Sultana
(74) *Attorney, Agent, or Firm* — Dinsmore & Shohl LLP

(57) ABSTRACT

Disclosed herein are systems and methods for ion exchanging glass articles. Methods for ion exchanging glass articles include receiving processing instructions from one or more user input devices, loading a cassette containing a plurality of glass articles into a molten salt bath of one or more ion exchange stations automatically with a robotic lift based on the processing instructions, removing the cassette from the molten salt bath automatically with the robotic lift after a predetermined time based on the processing instructions, and rotating the cassette automatically to drain fluid of the molten salt bath from the cassette.

29 Claims, 19 Drawing Sheets

(56) References Cited

U.S. PATENT DOCUMENTS

| | | | |
|---|---|---|---|
| 9,545,151 B2 | 1/2017 | Kaelin | |
| 9,845,263 B2 | 12/2017 | Morgan | |
| 9,908,676 B2 | 3/2018 | Sheehan et al. | |
| 9,914,200 B2 | 3/2018 | Wetherill | |
| 2004/0221615 A1* | 11/2004 | Postupack | C03C 21/002 65/30.14 |
| 2009/0211880 A1 | 8/2009 | Klaiber et al. | |
| 2010/0034631 A1 | 2/2010 | Klaiber et al. | |
| 2010/0047521 A1 | 2/2010 | Amin et al. | |
| 2013/0171456 A1 | 7/2013 | Fadeev et al. | |
| 2014/0120215 A1 | 5/2014 | Stokoe et al. | |
| 2014/0345325 A1 | 11/2014 | Allan et al. | |
| 2016/0039587 A1* | 2/2016 | Wetherill | B25B 11/00 269/13 |
| 2016/0157606 A1 | 6/2016 | Kaelin | |
| 2016/0251260 A1* | 9/2016 | Bayne | C08L 77/02 428/34.7 |
| 2016/0332909 A1* | 11/2016 | Abbott, Jr. | B08B 11/02 |
| 2018/0116907 A1* | 5/2018 | Fadeev | C03C 17/32 |
| 2019/0161399 A1* | 5/2019 | Fadeev | C03B 40/02 |
| 2020/0171478 A1* | 6/2020 | Bernard | B01J 47/011 |

\* cited by examiner

SYSTEMS AND METHODS FOR ION EXCHANGING GLASS ARTICLES

CROSS-REFERENCE TO RELATED APPLICATIONS

This application claims the benefit of priority under 35 U.S.C. § 120 of U.S. Provisional Application No. 62/428,016, entitled "Systems and Methods for Ion Exchanging Glass Articles," filed Nov. 30, 2016, the entirety of which is hereby incorporated by reference.

BACKGROUND

Field

The present specification generally relates to systems and methods for ion exchanging glass articles and, more specifically, to systems and methods for ion exchanging glass articles within a controlled processing cell.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Ion exchange processing is a process used to strengthen glass articles. Ion exchange imparts a compression (i.e., compressive stress) onto the surface of a glass article by chemically replacing smaller ions within the glass article with larger ions from a molten salt bath. The compression on the surface of the glass article raises the mechanical stress threshold to propagate cracks; thereby, improving the overall strength of the glass article. In order to achieve sufficient protection from flaws, a compressive depth of layer of approximately about 60-75 μm may be desirable. Surface compression and depth of layer are dependent on the ion exchange processing time and temperature. While time and temperature are increased to increase depth of layer, the surface compression decreases over time due to structural relaxation which reduces the strength of the glass article.

Furthermore, when processing a large amount of glass articles, a super structure that holds a plurality of glass articles known as a cassette is dipped into an ion exchange tank where the glass articles contact a molten salt bath and exchange ions with the molten salt bath. However, ion exchanging glass articles within such large cassettes has its drawbacks. Specifically, when capacity is variable, difficult to predict, or if different ion exchange cycles are needed for different types of glass or particular articles, such large cassettes can be highly inefficient. Furthermore, the use of larger fixtures may result in differential cooling from the inside to the outside of the cassette due to inefficiency of convective heat transfer. As noted above, when glass remains at a high temperature for longer times, the glass may experience what is known as structural relaxation. Structural relaxation refers to a decrease in compressive stress of the glass article resulting from extended exposure to high temperatures (e.g., during ion exchange processing and cooling), which may lead to diminished strength. Greater structural relaxation is experienced by glass articles located toward a center of the cassette versus glass articles located at an edge of the cassette during cooling. This translates into a larger range and lower values for the compressive stress property.

Accordingly, a need exists for alternative methods and systems for ion exchanging glass articles to achieve greater efficiencies and more uniform processing results.

SUMMARY

In a first aspect, a method for ion exchanging glass articles includes receiving processing instructions from one or more user input devices, loading a cassette containing a plurality of glass articles into a molten salt bath of one or more ion exchange stations automatically with a robotic lift based on the processing instructions, removing the cassette from the molten salt bath automatically with the robotic lift after a predetermined time based on the processing instructions, and rotating the cassette automatically to drain fluid of the molten salt bath from the cassette.

A second aspect according to the first aspect, wherein rotating the cassette automatically to drain the fluid of the molten salt bath from the cassette includes rotating the cassette around an axis and stopping rotation at a predetermined location.

A third aspect according to the first aspect, wherein rotating the cassette automatically to drain the fluid of the molten salt bath from the cassette includes: attaching a rotation tool onto an arm of the robotic lift, loading the cassette on to the rotation tool, and initiating a rotation sequence with the rotation tool to rotate the cassette.

A fourth aspect according to the third aspect, wherein the rotation sequence includes: rotating the cassette about 125° relative to a horizontal axis and holding the cassette at about 125° relative to the horizontal axis for a predetermined period of time, and rotating the cassette 225° relative to the horizontal axis and holding the cassette at about 225° relative to the horizontal axis for a predetermined period of time.

A fifth aspect according to the first aspect, wherein rotating the cassette automatically to drain the fluid of the molten salt bath from the cassette includes loading the cassette onto a rotation tool, wherein the rotation tool is coupled to a cover of the one or more ion exchange stations and initiating a rotation sequence with the rotation tool to rotate the cassette, wherein the rotation sequence includes rotating the cassette about 125° relative to a horizontal axis and holding the cassette at about 125° relative to the horizontal axis for a predetermined period of time and rotating the cassette 225° relative to the horizontal axis and holding the cassette at about 225° relative to the horizontal axis for a predetermined period of time.

A sixth aspect according to the first aspect, wherein the fluid of the molten salt bath is drained from the cassette and back into the molten salt bath.

A seventh aspect according to the first aspect, further including loading the cassette automatically into a pre-heat station with the robotic lift and pre-heating the cassette in a pre-heat furnace of the pre-heat station to a predetermined temperature.

An eighth aspect according to the first aspect, further including loading the cassette automatically into a cooling station with the robotic lift and cooling a temperature of the cassette.

An ninth aspect according the first aspect, further including loading the cassette automatically into a rinse station with the robotic lift and rinsing the cassette to substantially remove remaining residue from the molten salt bath.

In a tenth aspect, a system for ion exchanging a glass article includes one or more processors, a robotic lift communicatively coupled to the one or more processors and configured to manipulate a cassette, wherein the cassette is configured to secure a plurality of glass articles, and one or more memory modules communicatively coupled to the one or more processors. The one or more memory modules store logic that, when executed by the one or more processors, cause the one or more processors to automatically load the cassette into a molten salt bath with the robotic lift, automatically remove the cassette from the molten salt bath with the robotic lift after a predetermined time, and automatically rotate the cassette with the robotic lift to drain fluid of the molten salt bath from the cassette.

An eleventh aspect according to tenth aspect, wherein to automatically rotate the cassette with the robotic lift to drain the fluid of the molten salt bath from the cassette, the one or more processors execute logic to automatically attach a rotation tool onto an arm of the robotic lift, load the cassette onto the rotation tool, and initiate a rotation sequence with the rotation tool to rotate the cassette.

A twelfth aspect according to the eleventh aspect, wherein the rotation sequence includes rotating the cassette to about 125° relative to a horizontal axis and holding the cassette at about 125° relative to the horizontal axis for a predetermined period of time and rotating the cassette to about 225° relative to the horizontal axis and holding the cassette at about 225° relative to the horizontal axis for a predetermined period of time.

A thirteenth aspect according to the tenth aspect, wherein the fluid of the molten salt bath is drained from the cassette and back into the molten salt bath.

A fourteenth aspect according to the tenth aspect, further including a pre-heat station communicatively coupled to the one or more processors, wherein the one or more processors execute logic to load the cassette automatically into the pre-heat station with the robotic lift and pre-heat the cassette in a pre-heat furnace of the pre-heat station to a predetermined temperature.

A fifteenth aspect according to the tenth aspect, further including a cooling station communicatively coupled to the one or more processors, wherein the one or more processors execute logic to load the cassette automatically into the cooling station with the robotic lift and cool a temperature of the cassette.

A sixteenth aspect according to the tenth aspect, wherein the one or more processors execute logic to cause the robotic lift to automatically load the cassette into a rinse station to rinse residue of the molten salt bath from the cassette.

A seventeenth aspect according to the tenth aspect, wherein the one or more processors execute logic to load additional cassettes into the molten salt bath with the robotic lift and each cassette is reconfigurable relative to the other cassettes within the molten salt bath.

In an eighteenth aspect, a method for ion exchanging glass articles includes loading a plurality of glass articles within one or more cassettes, individually loading each of the one or more cassettes into a molten salt bath, wherein the one or more cassettes are reconfigurable relative to one another; individually removing each of the one or more cassettes from the molten salt bath after a predetermined time for each of the one or more cassettes; and individually rotating each of the one or more cassettes to drain fluid of the molten salt bath from the one or more cassettes.

A nineteenth aspect according to the eighteenth aspect, wherein rotating each of the one or more cassettes automatically to substantially drain the remaining fluid of the molten salt bath from each of the one or more cassettes includes attaching a rotation tool onto an arm of a robotic lift, loading each of the one or more cassettes individually onto the rotation tool, and initiating a rotation sequence with the rotation tool to rotate the each of the one or more cassettes.

A twentieth aspect according to the eighteenth aspect, wherein the rotation sequence includes rotating each of the one or more cassettes to about 125° relative to a horizontal axis and holding each of the one or more cassettes at about 125° relative to the horizontal axis for a predetermined period of time and rotating each of the one or more cassettes to about 225° relative to the horizontal axis and holding each of the one or more cassettes at about 225° relative to the horizontal axis for a predetermined period of time.

A twenty-first aspect according to the eighteenth aspect, rotating each of the one or more cassettes automatically to substantially drain the remaining fluid of the molten salt bath from each of the one or more cassettes includes loading each of the one or more cassettes individually onto a rotation tool, wherein the rotation tool is coupled to a cover of the one or more ion exchange stations and initiating a rotation sequence with the rotation tool to rotate each of the one or more cassettes, wherein the rotation sequence includes rotating each of the one or more cassettes about 125° relative to a horizontal axis and holding each of the one or more cassettes at about 125° relative to the horizontal axis for a predetermined period of time and rotating each of the one or more cassettes 225° relative to the horizontal axis and holding each of the one or more cassettes at about 225° relative to the horizontal axis for a predetermined period of time.

In a twenty-second aspect, a method of ion exchanging glass articles includes loading a plurality of glass articles within a magazine, loading the magazine into a cassette, wherein the cassette comprises a frame comprising a lateral side and a longitudinal side, wherein the lateral side has a length in a lateral direction that is less than a length of the longitudinal side in a longitudinal direction, and loading the cassette and magazine into a molten salt bath, wherein the cassette is configured to be reconfigurable relative to other cassettes positioned within the molten salt bath.

A twenty-third aspect according to the twenty-second aspect, further including removing the cassette from the molten salt bath after a predetermined period of time, wherein the cassette is configured to be removed from the molten salt bath separately from the other cassettes within the molten salt bath.

A twenty-fourth aspect according to the twenty-second aspect, wherein a plurality of magazines are stacked within the cassette.

A twenty-fifth aspect according to the twenty-second aspect, wherein the cassette is configured to hold a single stack of magazines in the lateral direction.

A twenty-sixth aspect according to the twenty-fifth aspect, wherein the cassette is configured to hold two stacks of magazines in the longitudinal direction.

A twenty-seventh aspect according to the twenty-second aspect, wherein the cassette further includes a divider separating a first portion of the cassette and a second portion of the cassette, wherein the divider defines a cooling channel extending between the first portion of the cassette and the second portion of the cassette.

A twenty-eighth aspect according to the twenty-second aspect, wherein the cassette is configured to cool to a predetermined temperature, wherein the predetermined temperature is a temperature wherein structural relaxation within the plurality of glass articles is substantially reduced in about less than 30 minutes.

A twenty-ninth aspect according to the twenty-second aspect, wherein the cassette further includes a horizontal cross member configured to vertically space at least two magazines from each other so as to define a horizontal channel extending therebetween.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
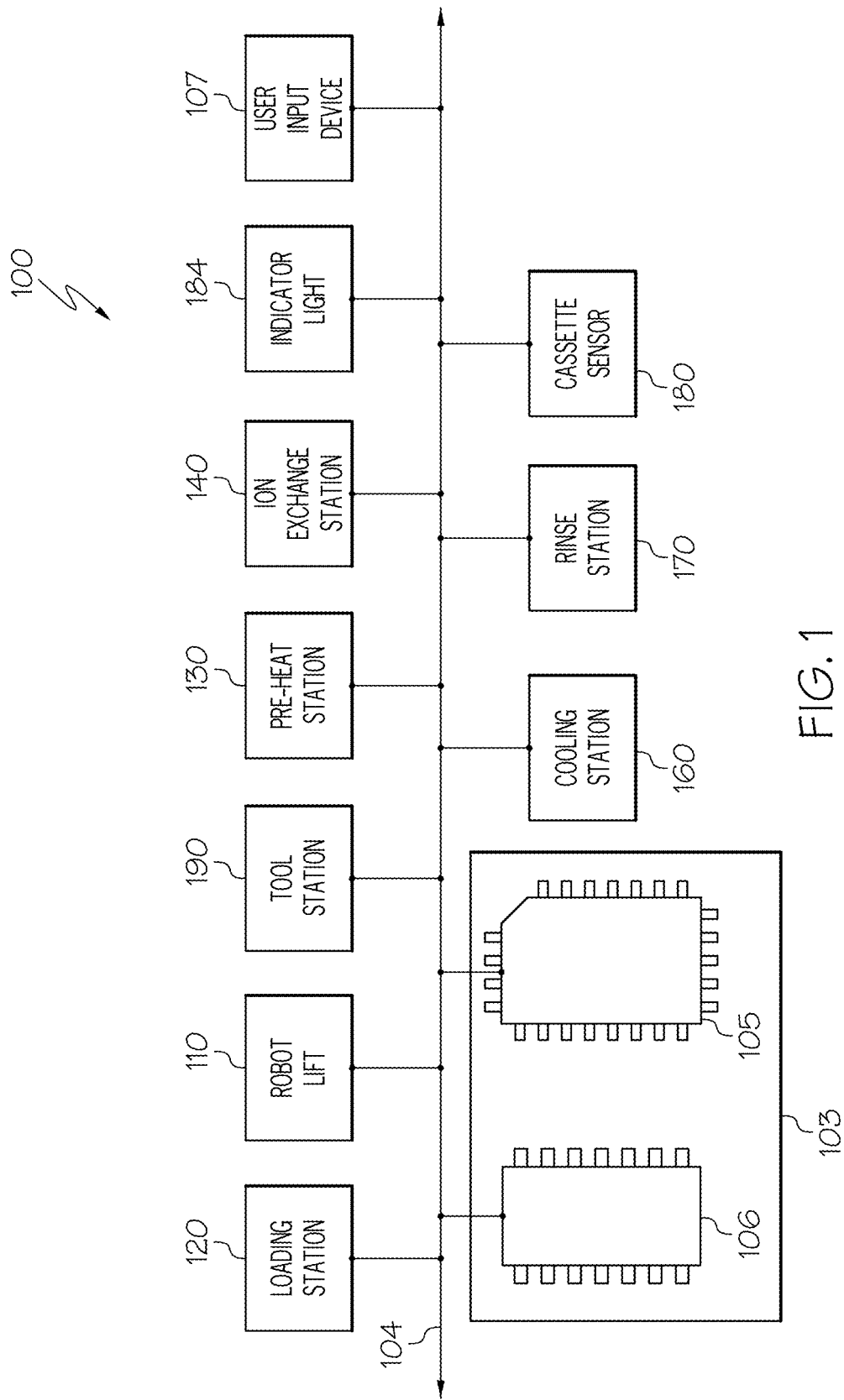
FIG. 1 schematically depicts a system for ion exchanging glass articles, according to one or more embodiments shown and described herein.

Referring generally to the figures, embodiments of systems and methods for ion exchanging glass articles provided herein allow for more efficient and cost effective ion exchange of glass articles. The systems and methods may utilize a robotic lift that can manipulate cassettes loaded with glass articles between multiple processing stations for an ion exchange operation on the glass articles. The robotic lift may both load individual cassettes loaded within glass articles into a tank of an ion exchange station and rotate the cassettes while or after the cassettes are being removed from the tank of the ion exchange station. The processing stations may be arranged to provide convenient access for the robotic lift, which can also allow for variation and customization of the use of certain processing stations depending, for example, on the particular ion exchange operation for the particular glass articles.

Reference will now be made in detail to various embodiments of systems and methods for ion exchanging glass articles, examples of which are illustrated in the accompanying drawings. Whenever possible, the same reference numerals will be used throughout the drawings to refer to the same or like parts. It will be understood that the illustrations are for the purpose of describing a particular embodiment of the invention and are not intended to limit the invention thereto. The drawings are not necessarily to scale, and certain features and certain views of the drawings may be shown exaggerated in scale or in schematic in the interest of clarity and conciseness.

Referring now to FIG. 1, FIG. 1 schematically depicts a system 100 for ion exchanging glass articles according to one or more embodiments. The system 100 includes a communication path 104, a control unit 103, and a robotic lift 110. The system 100 may further include a user input device 107, one or more cassette sensors 180, one or more indicator lights 184, and various processing stations including, but not limited to, a loading station 120, a pre-heat station 130, one or more ion exchange stations 140, a cooling station 160, a rinse station 170, and a tool station 190.

The control unit 103 as schematically depicted, may comprise any exemplary computing device and may comprise one or more processors 105 including any processing component configured to receive information and execute machine readable instructions, for example, from one or more memory modules 106 comprising RAM, ROM, flash memories, hard drives, or any device capable of storing machine readable instructions, such that the machine readable instructions can be accessed by the one or more processors 105. Each of the one or more processors 105 may be a controller, an integrated circuit, a microchip, a computer, or any other computing device. As will be described in greater detail herein, the control unit 103 automatically causes the robotic lift 110, based on a set of processing instructions, to manipulate cassettes configured to hold glass articles and to pass the cassettes from one processing station to another.

The one or more processors 105 and the one or more memory modules 106 of the control unit 103 are coupled to a communication path 104. As used herein, the term "communicatively coupled" means that coupled components are capable of exchanging data signals with one another, for example, electrical signals via conductive medium, electromagnetic signals via air, optical signals via optical waveguides, and the like. Accordingly, the communication path 104 may be formed from any medium that is capable of transmitting a signal, for example, conductive wires, conductive traces, optical waveguides, or the like. In some embodiments, the communication path 104 may facilitate the transmission of wireless signals, for example, WiFi, Bluetooth, and the like. Moreover, the communication path 104 may be formed from a combination of mediums capable of transmitting signals.

Figure 2:
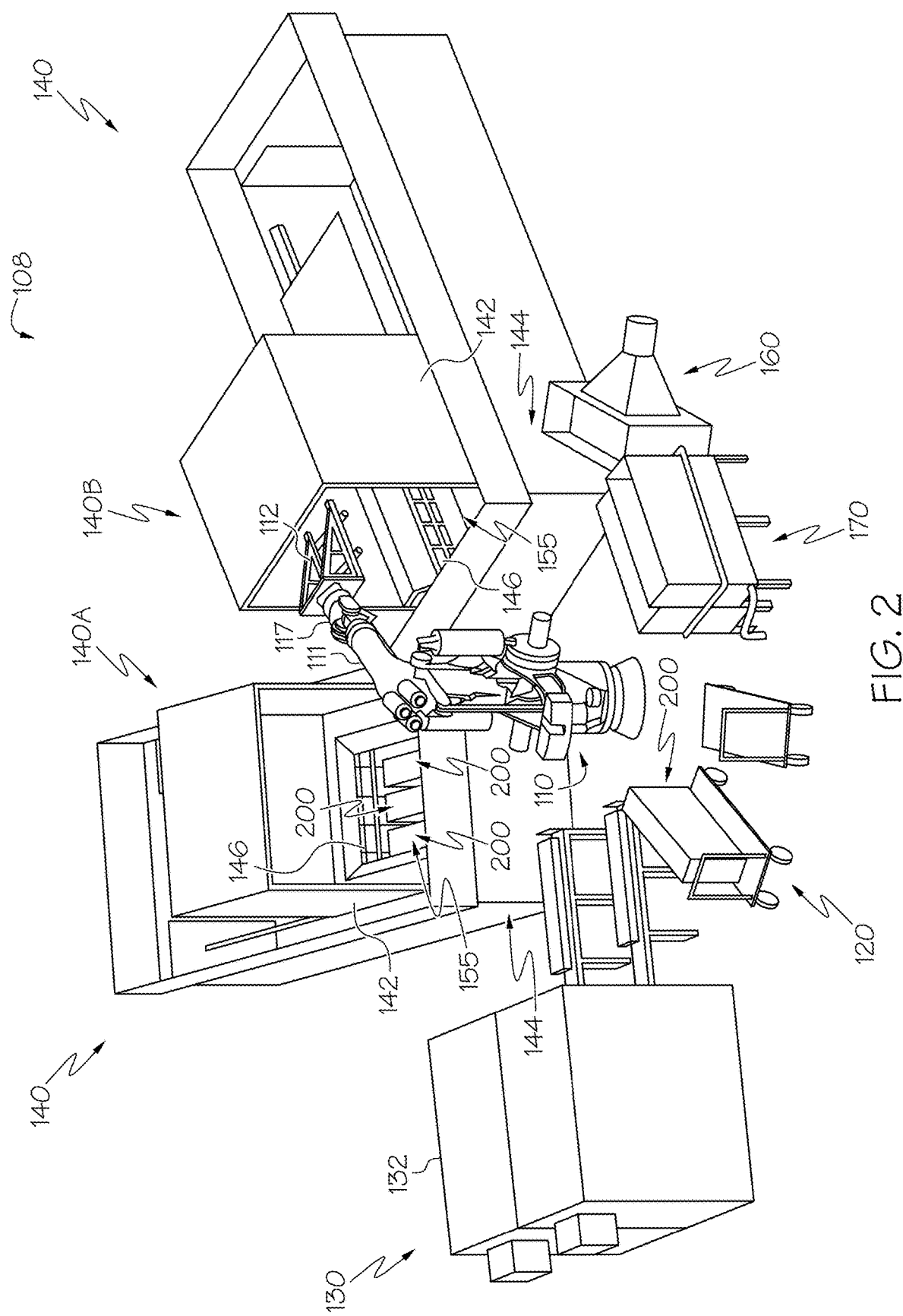
FIG. 2 schematically illustrates a processing cell of the system of FIG. 1, according to one or more embodiments shown and described herein.

Referring to FIG. 2, a processing cell 108 is depicted that includes the robotic lift 110, the loading station 120, the pre-heat station 130, a first ion exchange station 140A and a second ion exchange station 140B, the cooling station 160, and the rinse station 170. It is noted that in further embodiments, a fewer or a greater number of processing stations may be included depending, for example, on the desired ion exchange process. For example, in some embodiments there may be only one ion exchange station 140.

Figure 3A:
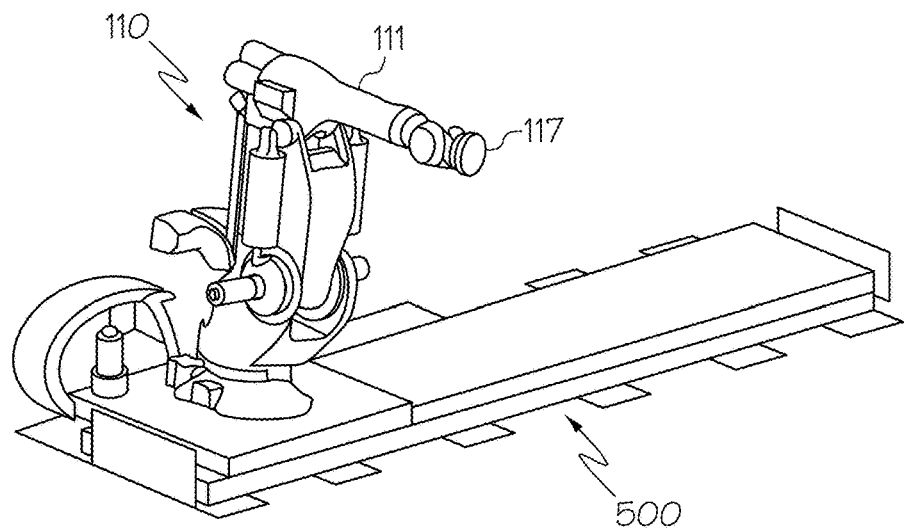
FIG. 3A illustrates a robotic lift of the system of FIG. 1 on a conveyor, according to one or more embodiments shown and described herein.
Figure 3B:
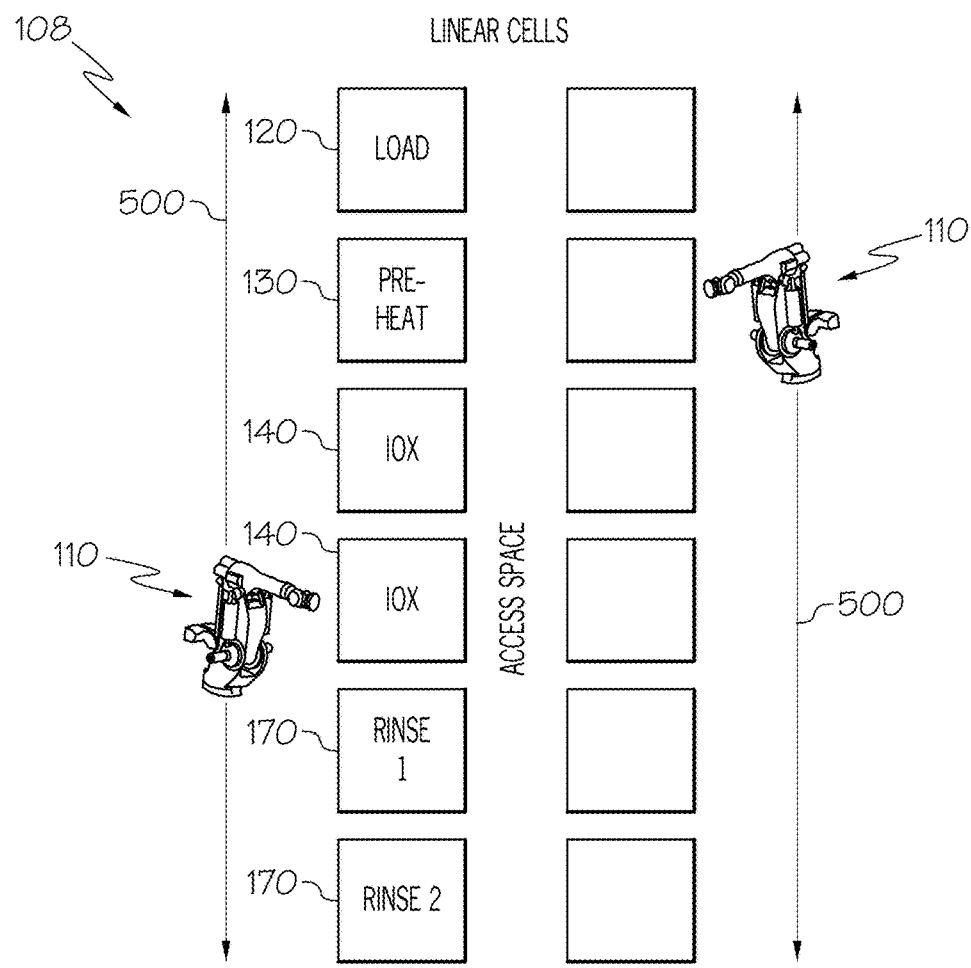
FIG. 3B schematically illustrates the robotic lift of the system of FIG. 1 and a linear processing cell, according to one or more embodiments shown and described herein.

The processing cell 108 in this embodiment depicts the robotic lift 110 surrounded by the various processing stations in a generally circular or semi-circular arrangement. Such arrangements may allow the robotic lift 110 to quickly and efficiently transport cassettes 200, as will be described in more detail herein, to the different processing stations. It is noted that other arrangements may also be acceptable. Referring briefly to FIGS. 3A and 3B, the processing cell 108 may instead have a linear configuration, wherein the various processing stations are configured in a linear arrangement. In this linear configuration, the robotic lift 110 may be transportable along a conveyor 500 between the various processing stations.

Referring again to FIG. 1, communicatively coupled to the control unit 103 is the robotic lift 110. The robotic lift 110 can have six degrees of freedom and provides programmable, high speed, low-vibration movement of cassettes 200 to the various processing stations within the processing cell 108. As such, referring to FIGS. 2, 4A and 4B, the robotic lift 110 may be configured to rotate 360° about the z-axis and may include an arm 111 configured to pick up and/or rotate a cassette 200. As such, the arm 111 may be at least one of an articulating arm, a gantry system, and a combination thereof for picking up and manipulating cassettes 200. Selectively attached to the arm 111 of the robotic lift 110 may be pick-up tool 112, configured to interact with a cassette 200 to lift the cassette 200, and a rotation tool 115, configured to provide customized rotation sequences to the cassette 200 relative to a horizontal axis. Based on processing instructions received from the control unit 103, the robotic lift 110 may selectively couple and decouple the pick-up tool 112 and the rotation tool 115 to an attachment device 117 of the robotic lift 110 depending on the operation being performed. For example, if the robotic lift 110 is simply moving a cassette 200 from one processing station to another, the pick-up tool 112 may be attached to the arm 111 by the attachment device 117 and used. In operations wherein the robotic lift 110 is rotating the cassette 200, the rotation tool 115 may be attached to the arm 111 by the attachment device 117 and used. In some embodiments, a single tool may be configured to both lift and rotate a cassette 200. For example, the single tool may include both pick-up and rotation, as described below.

Figure 4A:
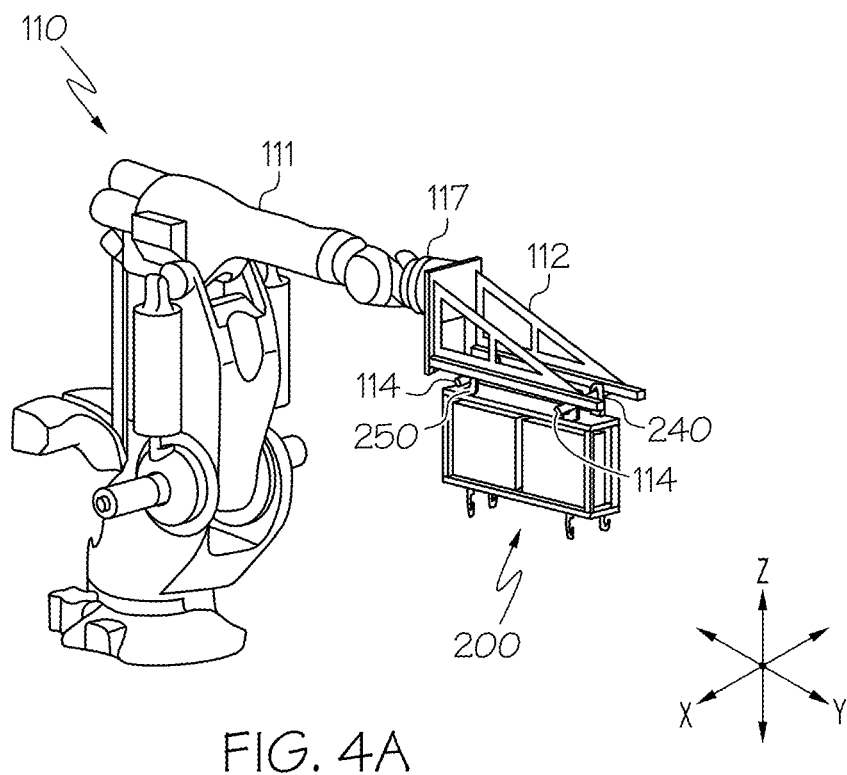
FIG. 4A illustrates a robotic lift of the system of FIG. 1 with a pick-up tool, according to one or more embodiments shown and described herein.

FIG. 4A illustrates a non-limiting embodiment of the robotic lift 110 with a pick-up tool 112 attached to the arm 111 by the attachment device 117. The pick-up tool 112 may be any tool configured to pick up a cassette 200. In the present example, the lifting tool includes one or more lift bars 114 over which hooks 240, 250 of a cassette 200 may by secured. In other embodiments, the pick-up tool 112 may include robotic grips that may be controlled by the control unit 103 to open and close the robotic grips over the hooks 240, 250 of the cassette 200. In some embodiments, different pick-up tools 112 may be provided that correspond with a type of cassette 200 that is being used for processing one or more glass articles. The pick-up tool 112 may conveniently interact with a cassette 200 to allow the robotic lift 110 to lift the cassette 200 from a top of the cassette. Hence, when a cassette 200 is located within a processing station (e.g., an ion exchange station 140) the cassette 200 may be lifted out of the processing station by its hooks 240, 250 without disturbing other cassettes 200 processing at the same time.

Figure 4B:
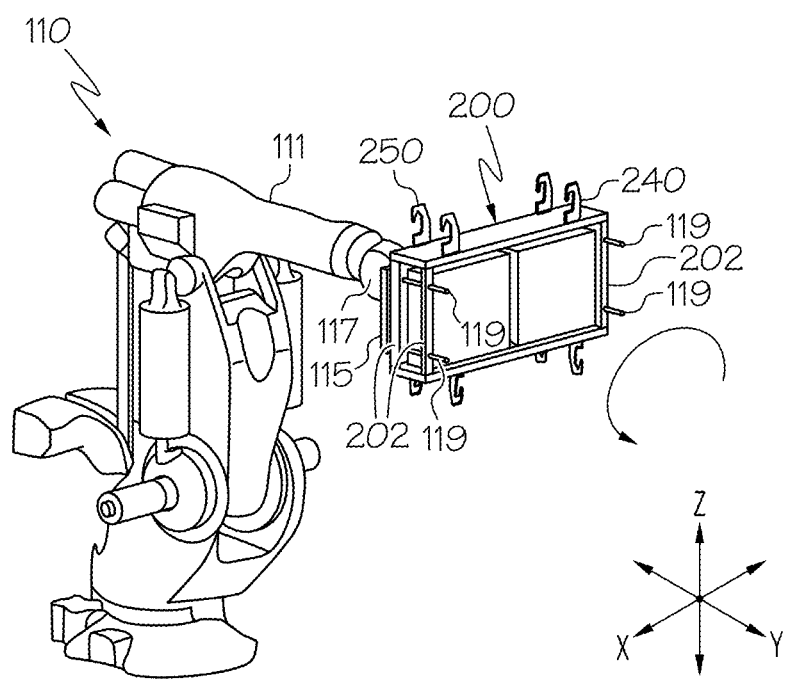
FIG. 4B illustrates a robotic lift of the system of FIG. 1 with a rotation tool, according to one or more embodiments shown and described herein.

FIG. 4B illustrates a non-limiting embodiment of the robotic lift 110 with a rotation tool 115 attached to the arm 111 by the attachment device 117. While the pick-up tool 112 may conveniently be able to engage a cassette 200 from the hooks 250, 420 of the cassette 200, the rotation tool 115 is able to secure the cassette 200 from a side of the cassette 200 so as to perform a rotation sequence. As such, the rotation tool 115 may be any tool configured to rotate a cassette 200 about a horizontal axis (y). As will be described in greater detail herein, after processing at the one or more ion exchange stations 140, the cassette 200 may be rotated by the rotation tool 115 to drain fluid from the cassette 200 after or while being removed from one or more of the one or more ion exchange stations 140. The rotation tool 115 may comprise a plurality of prongs 119 that are configured to pierce or otherwise engage the cassette 200, such that the cassette 200 is secured to the rotation tool 115 so that a rotation sequence may be performed with the cassette 200. For example, the rotation tool 115 may comprise four prongs 119 that pierce the cassette at four locations of the cassette. In other embodiments, the rotation tool 115 may instead, or in addition to the plurality of prongs 119, include one or more robotic grips that are configured to releasably grip the cassette 200. In some embodiments, rotation tool 115 may not be couplable to the robotic lift 110, and may be, for example, incorporated into the one or more ion exchange stations 140. Such embodiments will be described in more detail below.

Figure 5:
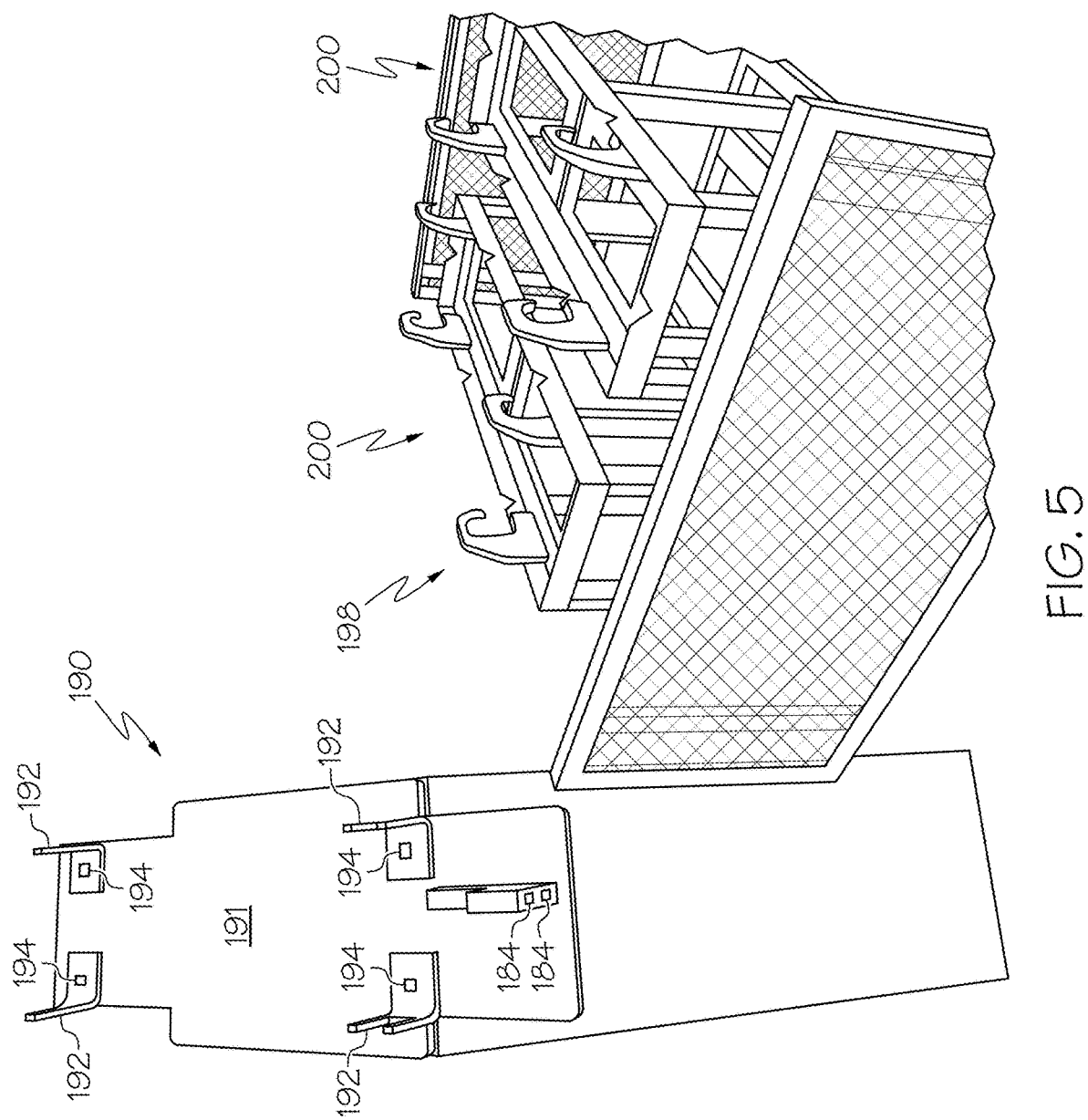
FIG. 5 illustrates a tool station of the system of FIG. 1, according to one or more embodiments shown and described herein.

Referring now to FIG. 5, when the pick-up tool 112 and the rotation tool 115 are not being used by the robotic lift 110, the pick-up tool 112 and the rotation tool 115 may be placed at a tool station 190. The tool station 190 may be any structure capable of receiving and holding the pick-up tool 112 and the rotation tool 115 (e.g., from the robotic lift 110) until needed by the system 100. FIG. 5 illustrates a non-limiting embodiment of the tool station 190. The tool station 190 may comprise tool receiving prongs 192 extending from a surface 191 of the tool station 190. The tool receiving prongs 192 are configured to hold the pick-up tool 112 and the rotation tool 115 when either is not in use in a fashion that the pick-up and rotation tools 112, 115 are releasably connectable to the attachment device 117 of the arm 111. For example, when the robotic lift 110 is simply transferring a cassette 200 from one process to another, the pick-up tool 112 may be coupled to the robotic lift 110. However, when the control unit 103 commands the robotic lift 110 to rotate a cassette 200, the robotic lift 110 may place the pick-up tool 112 onto the one or more tool receiving prongs 192 of the tool station 190 and then couple the rotation tool 115 to the arm 111 of the robotic lift 110 thereby switching between the pick-up and rotation tools 112, 115.

The tool station 190 may be communicatively coupled to the control unit 103 and may include one or more tool sensors 194. The one or more tool sensors 194 may output a tool signal indicative of a tool (e.g., pick-up tool 112 and/or rotation tool 115) being placed at the tool station 190. For example, and not as a limitation, the one or more tool sensors 194 may include weight sensors, optical sensors, and the like coupled to the surface 191, the tool receiving prongs 192, or the like. In some embodiments, the one or more tool sensors 194 may include thermal sensors. In such embodiments, the system 100 may determine, based on a temperature of the tool, that the specific tool was recently used by the robotic lift 110 in the one of the various processing stations. Based on the tool signal output by the one or more tool sensors 194, control unit 103 may be able to locate the pick-up tool 112 and/or the rotation tool 115 when needed and direct the robotic lift 110 to the tool. In some embodiments, the tool station 190 may have an indicator light 184 (e.g., a green light) to indicate when a tool is loaded on to the tool station 190. In further embodiments, the tool station 190 may have an indicator light 184 (e.g., a red light) to indicate when at least one of the tools is not loaded onto the tool station 190. In some embodiments, there may be no indicator lights 184, one or more tool sensors 194, or even a tool station 190.

Referring again to FIG. 1, as noted above, communicatively coupled to the control unit 103 may be a user input device 107. The user input device 107 may be provided for the system operator to communicate with the system 100. The user input device 107 may allow the system operator to input processing instructions into the system 100 to run various ion exchange processes having different parameters. For example, and not as a limitation, commands entered into the user input device 107 may include, but are not limited to, pre-heating parameters, ion exchange parameters, cooling parameters, and rinsing parameters. Each of the parameters may be adjusted for individual processing of one or more cassettes 200 as will be described in greater detail herein. Such parameters may include, but are not limited to, processing times, temperatures, and rotation sequences. The user input device 107 may take on any appropriate form. For example, the user input device 107 may be configured as a keyboard, buttons, switches, touch-sensitive pads, microphones, and the like. In some embodiments, the user input device 107 may be provided by a portable computing device such as a smart phone or tablet.

Each of the one or more processing stations may include one or more cassette sensors 180. The one or more cassette sensors 180 may be communicatively coupled to the control unit 103 and may output a signal indicative of the presence of a cassette 200 at any one of the processing stations. As such, the one or more cassette sensors 180 may be integrated into the loading station 120, the pre-heat station 130, the one or more ion exchange stations 140, the cooling station 160, and the rinse station 170. By having one or more cassette sensors 180 coupled to the various processing stations, the system 100 may be able to determine, based on the cassette signal of the one or more cassette sensors 180 the location of a given cassette 200 within the system 100. In this way, the control unit 103 may easily locate cassettes 200 within the processing cell 108 and manipulate the cassettes 200 with the robotic lift 110. The one or more cassette sensors 180 may include, but are not limited to, weight sensors, optical sensors, RFID chips, thermal sensors, or the like. In some embodiments, there may be no cassette sensors 180.

Figure 6:
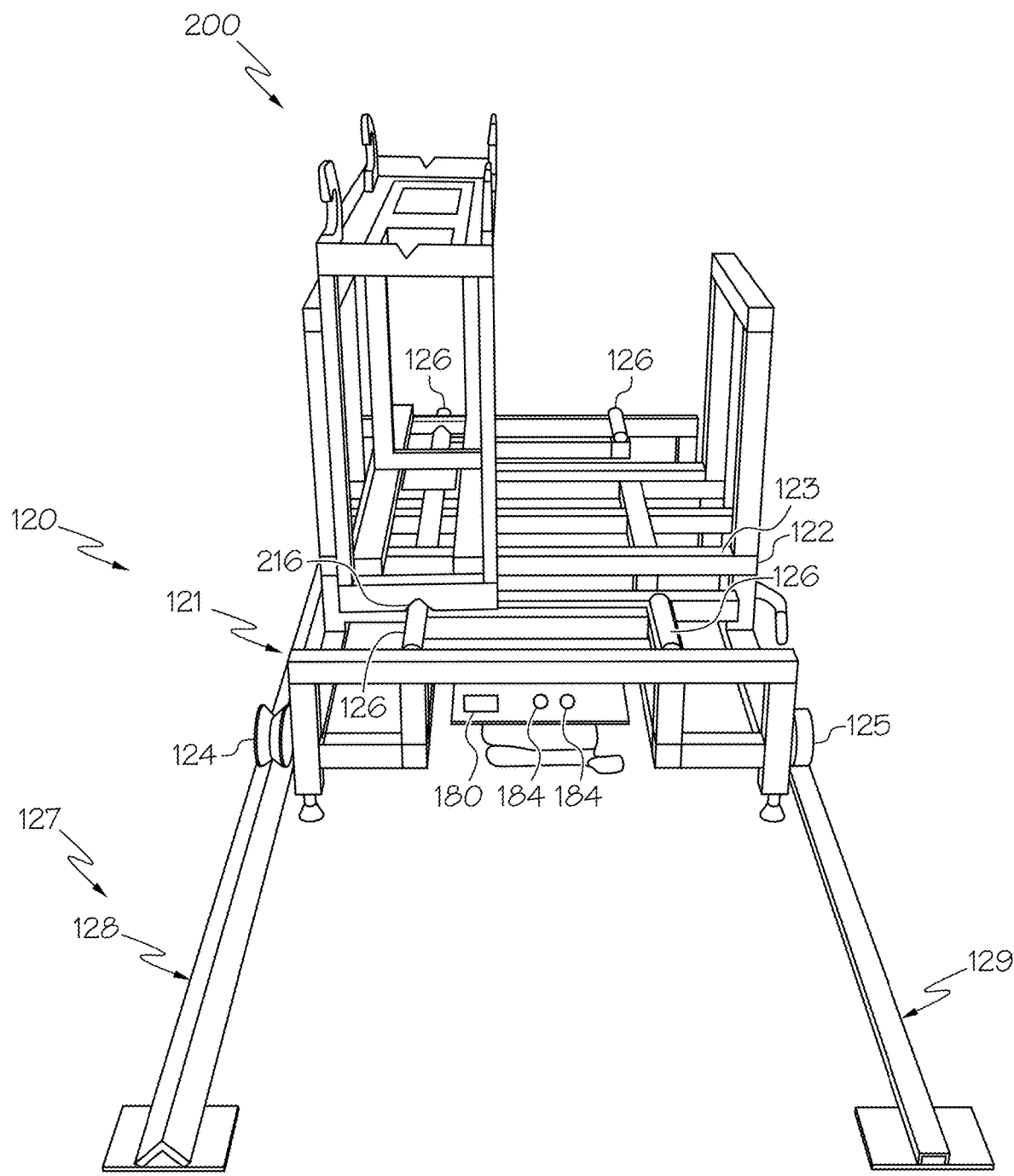
FIG. 6 illustrates a loading station of the system of FIG. 1, according to one or more embodiments shown and described herein.

Referring to FIG. 6, the system 100 may include the loading station 120. The loading station 120 may be communicatively coupled to the control unit 103 (FIG. 1). The loading station 120 may include a carriage 121 and a rail system 127 upon which the carriage 121 rides toward and away from the processing cell 108. In some embodiments, the carriage 121 may be motorized. As such, the one or more processors 105 of the control unit 103 may execute logic stored on the one or more memory modules 106, or in response to processing instructions received on the user input device 107, to cause the carriage 121 to move toward and away from the processing cell 108 along the rail system 127 so that the one or more cassettes 200 sitting on the carriage 121 may be in reach of the robotic lift 110.

Referring now specifically to the carriage 121, the carriage 121 includes a body portion 122 for supporting one or more cassettes 200 thereon. Coupled to the body portion 122 may be wheels 124, 125 which contact the rails 128, 129 of the rail system 127. The wheels 124, 125 may include an alignment wheel 124 and a stabilization wheel 125. The stabilization wheel 125 may have a kinematic shape that matches a profile of rail 128 of the rail system 127. Rail 128 of the rail system 127 may have an inverse kinematic shape compared to the kinematic shape of the stabilization wheel 125, such that when the alignment wheel 124 rides along rail 128, the rail 128 and the alignment wheel 124 interlock with one another. This interlocking arrangement may discourage the carriage 121 from misaligning with the rail system 127. Neither the stabilization wheel 125 nor rail 129 need have such an interlocking design but instead may interface flatly with one another. However, in further embodiments each of the wheels 124, 125 of the carriage 121 may be alignment wheels 124 and both rails 128, 129 of the rail system 127 may have a kinematic shape to interlock with the wheels 124, 125.

The carriage 121 may further include one or more cassette alignment rods 126 coupled to the body portion 122. The one or more cassette alignment rods 126 may extend across an entire surface 123 of the carriage 121 or only a portion thereof. The cassette alignment rods 126 may aid in the appropriate alignment of one or more cassettes 200 onto the carriage 121. As will be described in greater detail herein, the cassette 200 may include cutouts 216 that create a kinematic, interlocking relationship between the cassette 200 and the cassette alignment rods 126. Such alignment may allow the robotic lift 110 to more easily find and interact with the cassette 200 for processing. The cassette alignment rods 126 may have any configuration that allows a cutout 216 of the cassette 200 to interlock with the cassette alignment rods 126, as will be described in greater detail below. Furthermore, the cassette alignment rods 126 may not be limited to incorporation into the carriage 121 of the loading station 120. In further embodiments, cassette alignment rods 126 may similarly be incorporated into the pre-heat station 130, the one or more ion exchange stations 140, the cooling station 160, and the rinse station 170.

The loading station 120 may also include one or more cassette sensors 180 as described herein. In some embodiments, the loading station 120 may not include the one or more cassette sensors 180. However, in embodiments wherein the loading station 120 includes the one or more cassette sensors 180, the loading station 120 may further include one or more indicator lights 184 to output a light signal indicative of when one or more cassettes 200 are located on the loading station 120. For example, and not as a limitation, the indicator light 184 may glow green when a cassette 200 is ready to be picked up by the robotic lift 110 and the indicator light 184 may glow red if a cassette 200 is not ready to be picked up by the robotic lift 110.

Furthermore, while the loading station 120 is described as being communicatively coupled to the control unit 103, in some embodiments, the loading station 120 may not be in communication with the control unit 103 and may instead be a cart that is manually manipulated into and out of the processing cell 108, such as shown in FIG. 2.

Referring again to FIG. 1, communicatively coupled to the control unit 103 may be a pre-heat station 130. Referring now to FIG. 2, the pre-heat station 130 may include a pre-heat furnace 132 that receives a cassette 200 from the robotic lift 110 and heats the cassette 200 to a predetermined temperature. In some embodiments, the cassette 200 may be pre-heated to a temperature greater than room temperature and less than or equal to the temperature of the molten salt bath 155 in the ion exchange tank 144. For example, the glass articles 350 disposed within a cassette 200 may be pre-heated to a temperature from about 300° C.-500° C. However, it should be understood that pre-heating the cassette 200 is optional and that some embodiments may not include a pre-heat station 130. Furthermore, because the pre-heat station 130 may be communicatively coupled to the control unit 103, the one or more processors 105 of the control unit 103 may execute logic to control pre-heat temperature and pre-heat time of the pre-heat furnace 132. In other embodiments, the control unit 103 may not control pre-heat parameters of the pre-heat furnace 132.

As described herein, the system 100 may further include one or more ion exchange stations 140. Ion exchange is a method of strengthening glass articles by increasing surface compressive stress. In particular, surface compressive stress (also referred to herein as "CS"), central tension, and depth of the CS layer (also referred to herein as "depth of layer" or "DOL") are three factors that affect the performance of chemically strengthened glass. CS and DOL combined are necessary to protect against the propagation of micro-flaws that are artifacts created by normal finishing processes. CS provides resistance to damaging contact forces, such as blunt or sharp impacts. If the depth of layer is adequate, compressive strength is directly proportional to the strength and impact energy resistance of the chemically strengthened glass.

Figure 7:
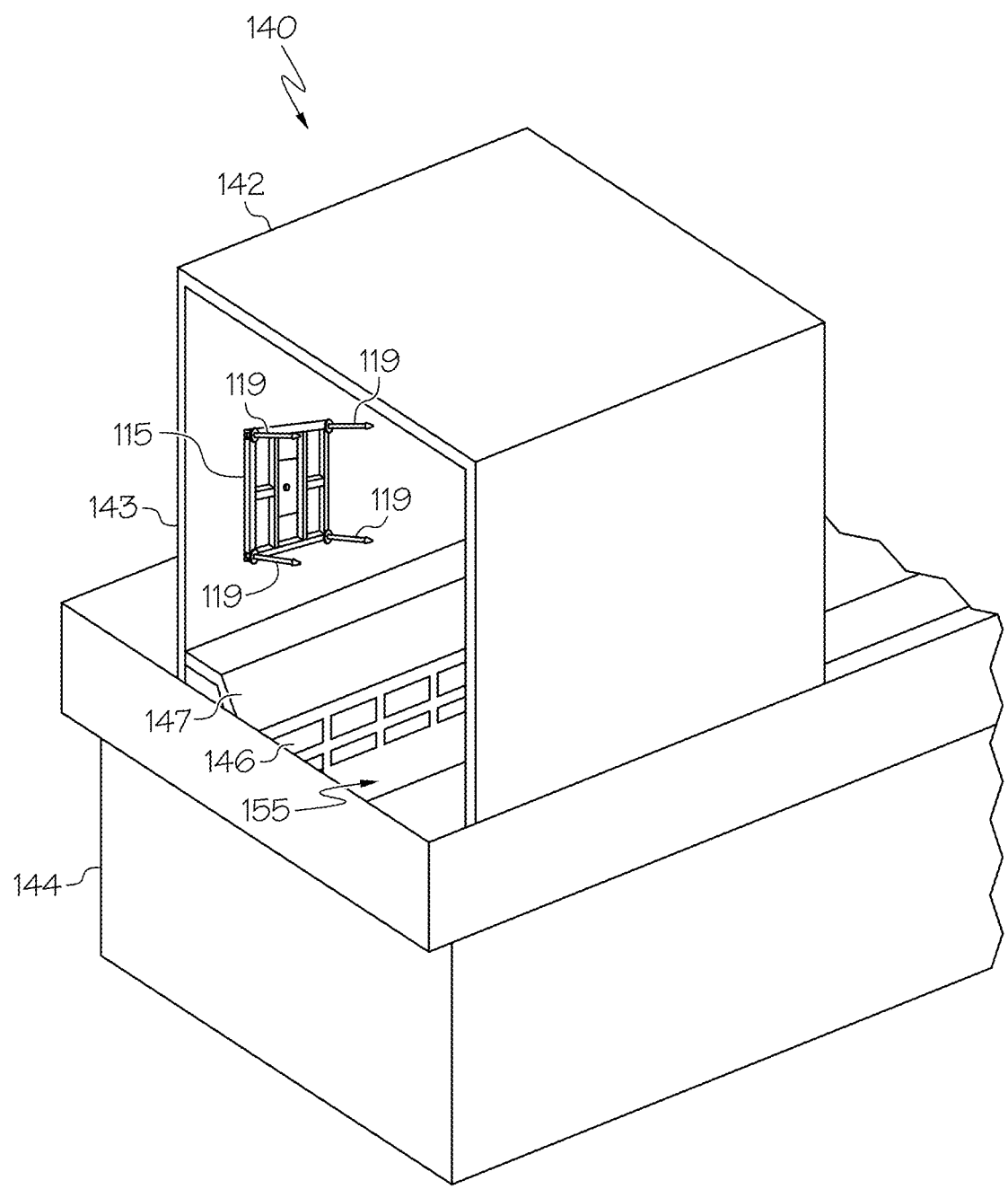
FIG. 7 illustrates a perspective view of an ion exchange station of the system of FIG. 1, according to one or more embodiments shown and described herein.

Referring to FIG. 7, the ion exchange station 140 is generally depicted. The ion exchange station 140 includes a tank 144. The tank 144 is configured to hold a molten salt bath 155. Molten salt baths 155 are prepared by adding the desired amount of effluent salt and the salt of the ion to be exchanged with the effluent in a glass article. In one embodiment, the ions are alkali metal ions—i.e., Li+, Na+, K+, Cs+, and Rb+. Larger alkali metal ions in the bath replace smaller alkali metal ions in the glass article. For example, Li+ ions in the glass may be replaced with Na+, K+, Cs+, or Rb+ ions, Na+ ions in the glass may be replaced with K+, Cs+, or Rb+ ions, and so on. Typically, the alkali metal ions in the glass are exchanged with ions of the next largest alkali metal ion. For example, Na+ ions in the glass are usually exchanged with K+ ions in the bath. The salt (or salts) is melted and heated to a predetermined temperature, typically in a range from about 380° C. up to about 570° C., and the molten salt bath 155 is held at that temperature to stabilize for a predetermined time. As such, coupled to the tank 144, though not shown, are one or more heating elements to heat the molten salt bath 155 to temperatures appropriate for ion exchange. It will be appreciated by those skilled in the art that other temperatures may be used. While the tank 144 is generally shown as a rectangular shape, other shapes are also contemplated.

Referring again to FIG. 1, the one or more ion exchange stations 140 may be communicatively coupled to the control unit 103 to control different operating parameters of the one or more ion exchange stations 140. However, in other embodiments, the one or more ion exchange stations 140 may not be communicatively coupled to the control unit 103. In embodiments wherein the one or more ion exchange stations 140 are communicatively coupled to the control unit 103, the control unit 103 may execute logic to adjust the temperature of the molten salt bath 155 of the one or more ion exchange stations 140, the opening and closing of a lid 147 of the one or more ion exchange stations 140' (shown in FIGS. 9A and B), the operation of a rotation tool 115 incorporated into an ion exchange station 140 as described herein, or the like.

Again referring to FIG. 7, in some embodiments, the ion exchange station 140 may include a liner 146 shaped to fit within the tank 144. The liner 146 may be removable to facilitate replacement of the molten salt bath 155. As salt is used up for ion exchange purposes, the molten salt bath 155 experiences poisoning due to the exchange of ions between glass articles and the molten salt bath 155. Poisoning occurs when the salt counter ion concentration (ions from the glass articles) increases proportionally to the volume or number of glass parts that are ion exchanged in the molten salt bath 155. "Fresh" salt (i.e., salt newly introduced to the bath) provides the highest CS in chemically strengthened glass. Every subsequent run, however, increases the concentration of the small ions exchanged out of the glass into the molten salt bath 155. Conversely, the concentration of the salt that provides the larger ions decreases with each glass part strengthened in a molten salt bath, consequently reducing the CS of the finished product, despite carrying out the ion exchange process at constant temperature and time. In high volume production, significant variability in CS may therefore be observed from one glass article to the next. Typically, once poisoning of the molten salt bath 155 has decreased CS of a glass article below a certain value, the salt of the molten salt bath 155 is replaced. In embodiments incorporating the liner 146, the liner 146 may be removed and replaced with a new liner full of salt with an overhead gantry. In such embodiments, the liner 146 may have a sealable lid to enable movement of the old molten salt bath 155 for replacement. In other embodiments, the tank 144 may have a drain incorporated therein. For example, in larger tanks, e.g. tanks larger than or equal to about 2 $m^3$, removable liners may not be practicable due to size constraints, and so drains may provide an alternative. However, it is noted that the tanks 144 of the one or more ion exchange stations 140 may be of any size. In some embodiments, the ion exchange tank 144 may be less than or equal to about 1.5 $m^3$, in other embodiments, the ion exchange tank 144 may be less than or equal to about 1 $m^3$. It is noted while larger tanks may be used, smaller tanks have a significantly high temperature controlled surface area to liquid holding volume ratio, which could allow for more efficient heat up and cool down times. Furthermore, it is noted that a depth of an ion exchange tank 144 may not affect ion exchange performance of the ion exchange station 140, so long as thermal control is maintained.

The ion exchange station 140 may further include a hood 142 extending over the tank 144. In some embodiments, a rotation tool 115 may be coupled to a wall 143 of the hood 142 instead of, or in addition to, the robotic lift 110 as described herein. As described above, the rotation tool 115 may include a plurality of prongs 119 that may pierce the cassette 200 to rotate the cassette 200. Thus, in operation, control unit 103 may cause the robotic lift 110 to mount the cassette 200 onto the rotation tool 115. The rotation tool 115 may be motorized such that the one or more processors 105 of the control unit 103 can execute logic to cause the rotation tool 115 to perform a rotation sequence to substantially drain the cassette 200 of remaining fluid from the molten salt bath 155. The rotation tool 115 may be offset from the molten salt bath 155 so as not to impede the robotic lift's 110 ability to reach into the molten salt bath 155 to retrieve a cassette 200. In such embodiments, below the rotation tool 115, the ion exchange station 140 may further include a slanted wall 147 that slants toward the molten salt bath 155. Hence, any fluid drained by the rotation sequence performed on the cassette 200 by the rotation tool 115 may be directed back into the molten salt bath 155. This also has the added benefit of preserving the molten salt bath 155 to use in subsequent ion exchange operations.

Figure 9A:
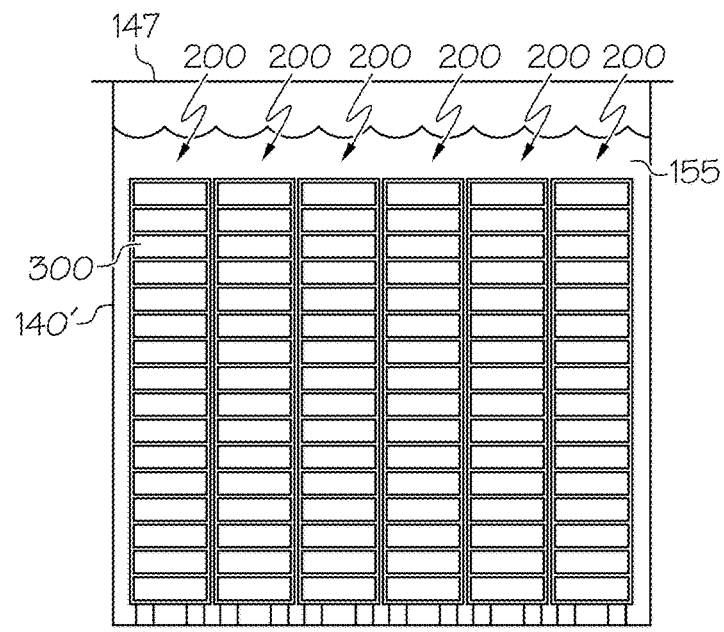
FIG. 9A illustrates a plurality of cassettes within an ion exchange station, according to one or more embodiments shown and described herein.
Figure 9B:
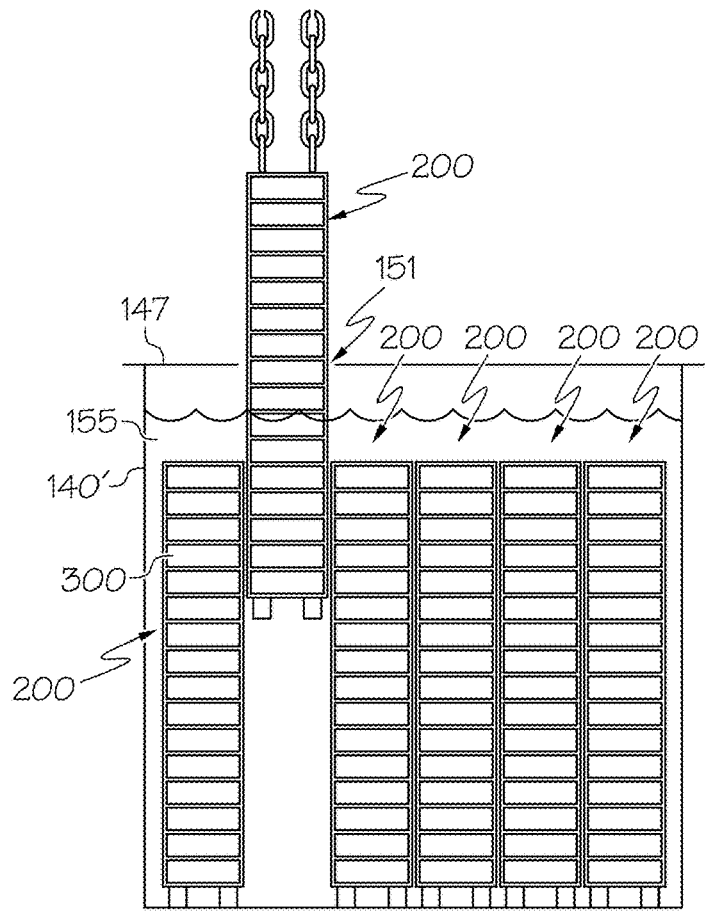
FIG. 9B illustrates a slice cassette of FIG. 9A being lifted from an ion exchange station, according to one or more embodiments shown and described herein.

Referring briefly to FIGS. 9A and 9B, another embodiment of an ion exchange station 140' is schematically depicted. In this embodiment, the ion exchange station 140' comprises a lid 147 extending over the molten salt bath 155. The lid 147 may be selectively opened to remove one or more cassettes 200 and closed to inhibit access to the cassettes 200. In such embodiments, the lid 147 may be motorized and controllable by the control unit 103 so that only a portion of the molten salt bath 155 is exposed when a cassette 200 is being removed from the molten salt bath 155. Hence, an opening 151 of the lid 147 may be opened to only a size large enough to allow for the removal of a cassette 200, such that other cassettes 200 are left substantially unexposed. This may allow heat to be better retained within the tank 144 when removing a cassette 200 therefrom.

Referring again to FIG. 2, in some embodiments, the one or more ion exchange stations 140 may include a first ion exchange station 140A and a second ion exchange station 140B. The second ion exchange station 140B may allow for a second ion exchange process to be implemented on the one or more glass articles placed therein. In other embodiments, a molten salt bath 155 of the second ion exchange station 140B may be kept at a different temperature (e.g., lower) than the first ion exchange station 140A. For example, the molten salt bath 155 of the second ion exchange station 140B may be maintained at a temperature just above the melting temperature of the salt, which can be a lower temperature of the salt bath 155 of the ion exchange station 140A. Hence, in certain ion exchange processes, the robotic lift 110 may move a cassette 200 from the first ion exchange station 140A and into the second ion exchange station 140B to rapidly quench the cassette 200. Cooling in salt may increase thermal heat transfer from the glass articles of the cassettes 200 by about 10 times versus cooling in air. Such rapid uniform quenching may improve product uniformity (e.g., CS and DOL) across the plurality of glass articles being processed. Furthermore, in such embodiments, the cassette 200 may be inserted upside down into the second ion exchange station 140B to minimize the need to perform a rotation sequence upon removing the cassette 200 from the second ion exchange station 140B. It is contemplated that in further embodiments, there may be more than two ion exchange stations 140.

Referring to FIGS. 1 and 2, the system 100 may further include the cooling station 160. The control unit 103 may cause the robotic lift 110 to remove the cassette 200 from the one or more ion exchange stations 140 and insert the cassette 200 into the cooling station 160. The cooling station 160 may be any device configured to uniformly direct air over the cassette 200 to cool a temperature of the cassette 200. For example, and not as a limitation, the cooling station 160 may include a fan and a blower to blow air onto the cassette 200 and pull the air through the cassette 200. In some embodiments, the cooling station 160 may be communicatively coupled to the control unit 103. The control unit 103 may determine when a cassette 200 has been placed within the cooling station 160, based on a cassette signal output from one or more cassette sensors 180 as described herein, to activate the cooling station 160 to cool the temperature of the cassette 200. In other embodiments, the cooling station 160 may not be provided.

The system 100 may further include the rinse station 170. In some embodiments, there may be multiple rinse stations 170 to rinse/dissolve crystallized salt from the cassettes 200 and the plurality of glass articles stored therein. The rinse station 170 may include reverse osmosis water or other types of purified water to rinse the cassette 200. The water of the rinse station 170 may be kept at a temperature of about 80° C., though the temperature of the water could be warmer or cooler in other embodiments. The rinse station 170 may be communicatively coupled to the control unit 103, such that the control unit 103 can execute logic to control various aspects of the rinse station 170. For example, the one or more processors 105 of the control unit 103 may execute logic to adjust a temperature of the rinse station 170 or the like.

After processing, the control unit 103 may execute logic to move the cassette 200, using the pick-up tool 112, to the holding station 198 (shown in FIG. 5) for retrieval from the processing cell 108. In other embodiments, there may be no holding station 198.

Cassettes 200 according to embodiments described herein, generally embody a slice cassette concept. That is, cassettes 200 according to the present disclosure are configured such that several cassettes 200 may be processed at once though the several cassettes 200 may require differing processing parameters (e.g., ion exchange times). However, though embodiments include the sliced cassette concept as will be described in greater detail below, the above control scheme may be implemented on conventional cassettes as well.

Figure 8A:
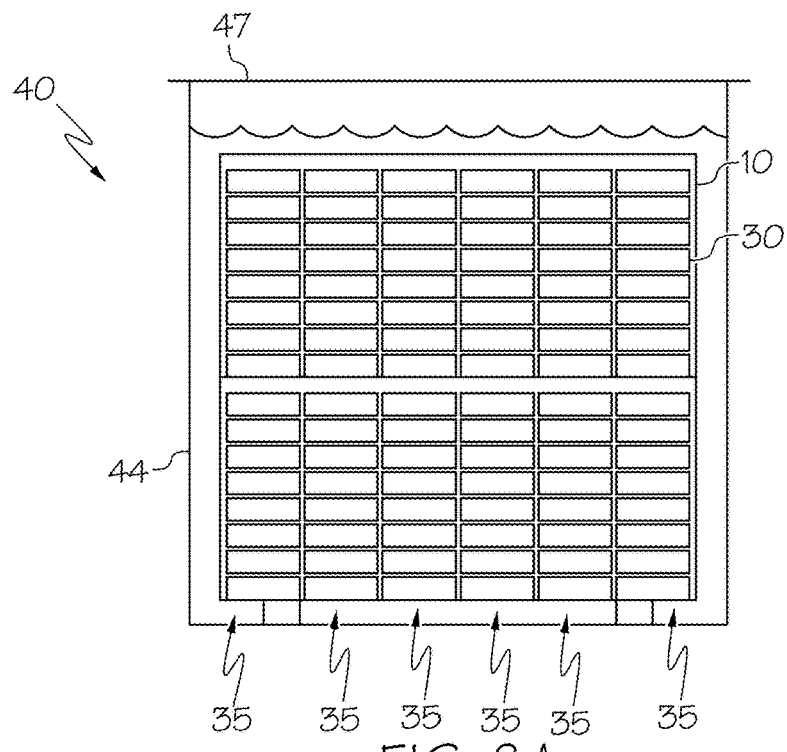
FIG. 8A illustrates a conventional cassette and within an ion exchange bath.
Figure 8B:
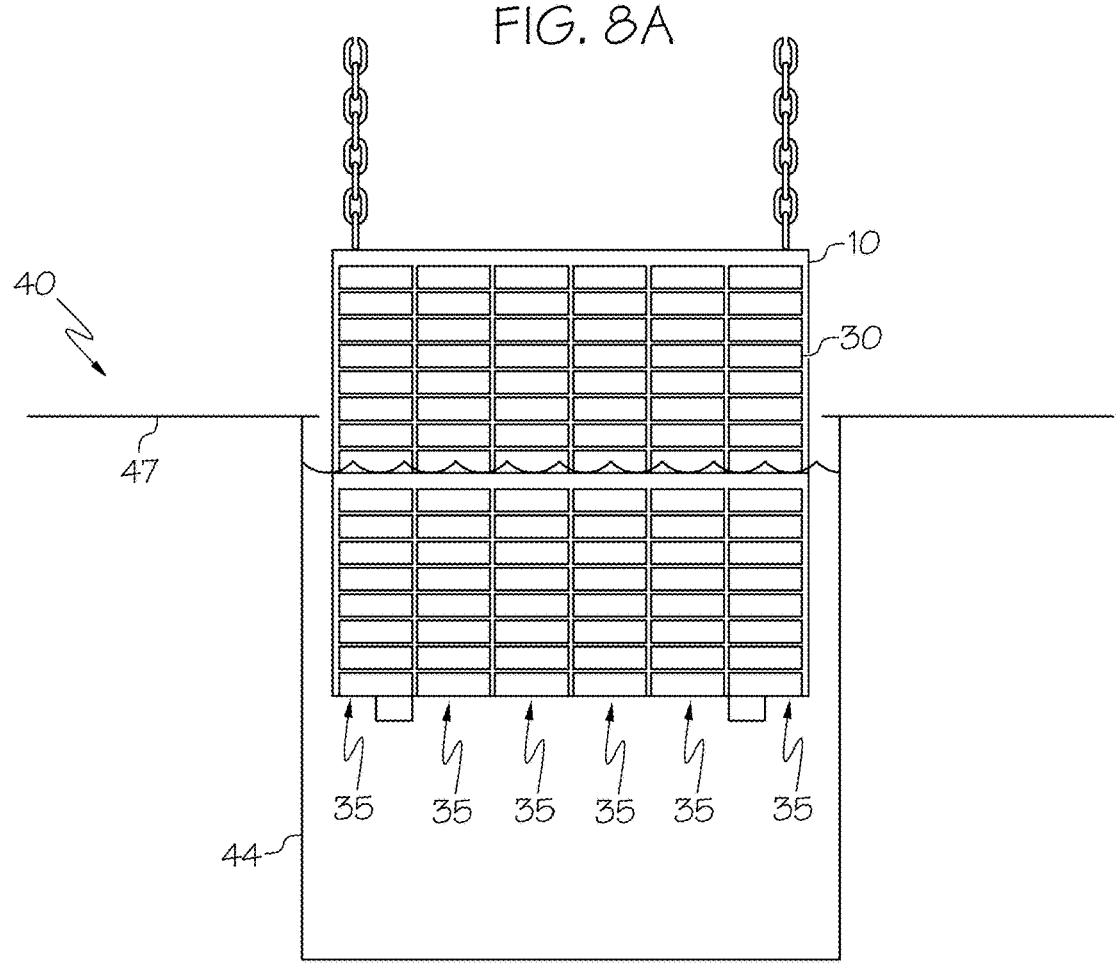
FIG. 8B illustrates the conventional cassette of FIG. 8A being lifted from the ion exchange bath.

Referring to FIGS. 8A and 8B, FIGS. 8A and 8B schematically depict an ion exchange station 40, a conventional cassette 10, and a plurality of magazines 30 stacked within the conventional cassette 10. The magazines 30 may typically be stacked such that the conventional cassette 10 is sized to fit several magazine stacks 35 along its width. For example, the conventional cassette 10 shown includes six magazine stacks 35 that are each sixteen magazines 30 tall. As illustrated, conventional cassettes 10 are generally sized to match the size of the ion exchange tank 44. As such, use of a conventional cassette 10 requires the removal and insertion of the magazine stacks 35 into the ion exchange station 40 all at one time for maximum efficiency. After ion exchange processing, the conventional cassette 10 and the plurality of glass articles contained therein must cool to prevent the plurality of glass articles from continuing to structurally relax. Structural relaxation is the tendency of the compressive stresses imparted to the plurality of glass articles through ion exchange processing to gradually reduce. However, due to the large size of conventional cassettes 10, there may be reduced cooling uniformity between glass articles positioned toward an outside edge of the conventional cassette 10 and those located toward a middle of the conventional cassette 10. Thus, the uniformity of compressive stresses of the plurality of glass articles within the conventional cassette 10 may be compromised. Furthermore, the large size of the conventional cassette 10 may require relatively higher cost equipment for the various processing stations. For example, processing equipment must be more robust (e.g., stronger) to handle conventional cassettes 10. Furthermore, because only one conventional cassette 10 may be inserted into a tank of the ion exchange station 40 at one time, small-batch ion exchange procedures would be highly inefficient because processing times could not be adjusted for multiple types of glass articles located in the conventional cassette 10.

Referring now to FIGS. 9A and 9B, the slice cassette concept is schematically depicted according to at least one embodiment of the present disclosure. In this embodiment, instead of a single conventional cassette 10 (depicted in FIGS. 8A-8B), multiple cassettes 200 are positioned adjacent to one another in a side-by-side arrangement within the tank 144 of the one or more ion exchange stations 140 while retaining their ability to be independently manipulated and reconfigurable relative to other cassettes 200 positioned within the tank. This independent manipulation may allow the differing cassettes 200 to have different processing times, because an individual cassette 200 may be removed from the molten salt bath 155 without substantial disruption of ion exchange for the remaining cassettes 200. Furthermore, the various cassettes 200 may be spaced apart from one-another to allow the molten salt bath 155 to completely surround each of the cassettes 200.

Figure 10:
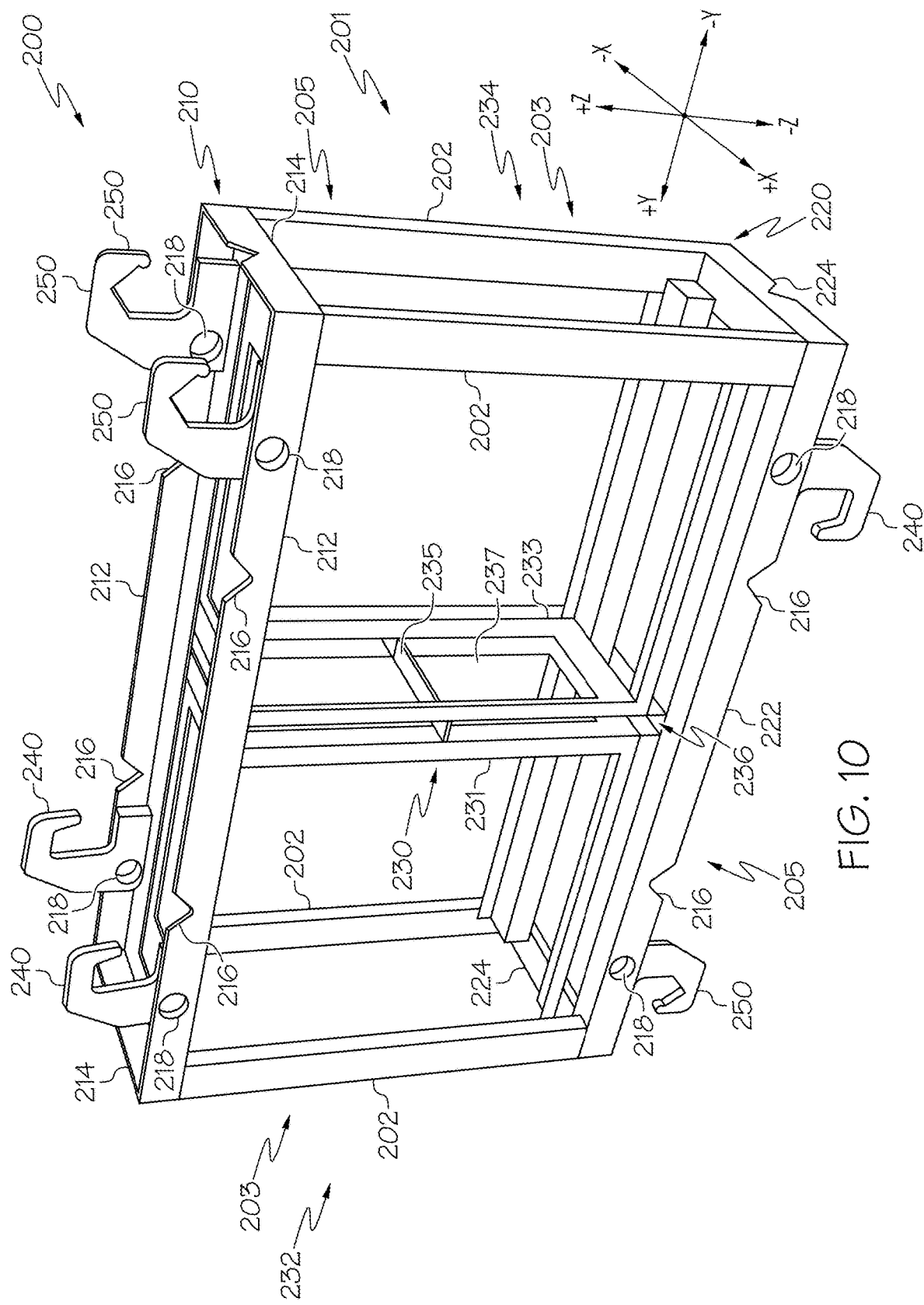
FIG. 10 illustrates a perspective view of a cassette, according to one or more embodiments shown and described herein.

Referring now to FIG. 10, a perspective view of an empty cassette 200 according to one or more embodiments is shown. The cassette 200 may include a frame 201, one or more locking hooks 250, and one or more support hooks 240. The cassette may be narrower in a lateral direction, x, than a longitudinal direction, y. A height of the cassette 200 can vary and may be dependent on mechanical handling limitations and the dimensions of the various processing stations described herein. The cassette 200 may be made out of a variety of materials, including, but not limited to stainless steel 304L, stainless steel 316L, or the like. The cassette 200 may be formed by any suitable process including, machining, welding, casting, and the like.

The frame 201 may include an upper frame 210 comprising at least two upper longitudinal members 212 extending in the longitudinal direction (y), at least two upper lateral members 214 extending in the lateral direction (x) and a lower frame 220 comprising at least two lower longitudinal members 222 extending in the longitudinal direction, and at least two lower lateral members 224 extending in the lateral direction. The upper frame 210 and the lower frame 220 may be coupled together through a plurality of vertical members 202 extending in the vertical direction (z) at each corner of the frame 201.

Figure 11:
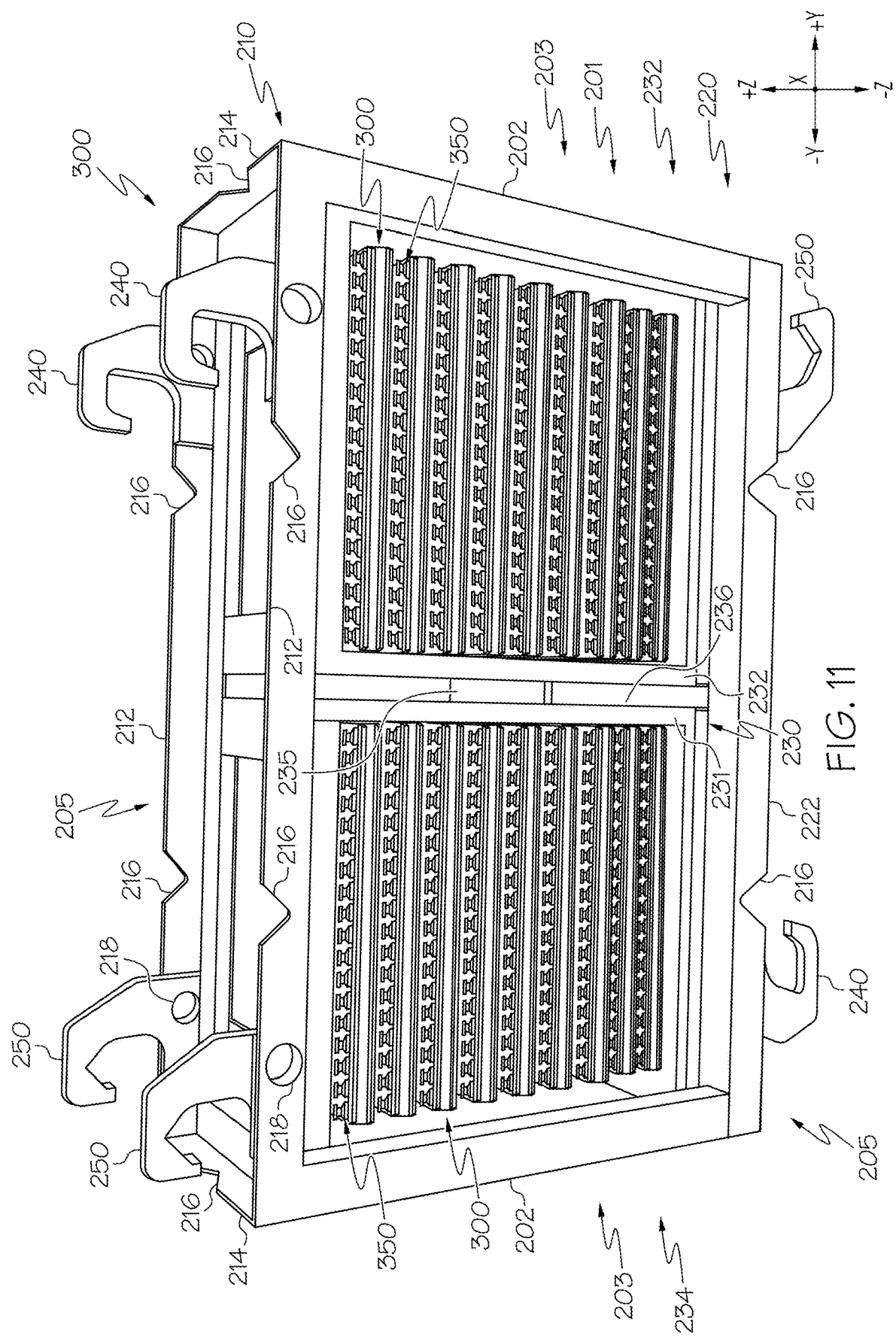
FIG. 11 illustrates a perspective view of the cassette of FIG. 10 loaded with a plurality of magazines, according to one or more embodiments shown and described herein.

The frame 201 may be divided by a divider 230 into a first portion 232 and a second portion 234. In this way, magazines 300 (such as shown in FIG. 11) may be stacked in both the first portion 232 and the second portion 234. The divider 230 may be substantially parallel to a lateral side 203 of the cassette 200 and substantially perpendicular to a longitudinal side 205 of the cassette 200. The divider 230 may include a first frame member 231 and a second frame member 233 extending parallel to one another in the vertical direction, z, between the longitudinal sides 205 of the cassette 200. The first frame member 231 and the second frame member 233 may be spaced apart from one another in the longitudinal direction, y, to provide a cooling channel 236 there between. The cooling channel 236 may allow air to flow through the cassette 200 while the cassette 200 is cooling. A spacer 235 may extend between a portion of the first frame member 231 and the second frame member 233 to couple the first frame member 231 and the second frame member 233 to add further rigidity to the frame 201. The first frame member 231 and the second frame member 233 may also define of a pass through 237 connecting the cooling channel 236 and the first and second portions 232, 234 of the frame 201. This construction may allow heat from the inside of a full cassette 200 (such as shown in FIG. 11) to escape through the cooling channel 236. In other embodiments there may not be a divider 230.

The frame 201 may include the plurality of cutouts 216 along a perimeter of the upper frame 210 and the lower frame 220. The plurality of cutouts 216 of the upper and lower frame 210, 220 may substantially align with one another. The plurality of cutouts 216 may aid in the kinematic alignment of the cassettes 200 with the various processing stations as described herein. For example, referring to FIG. 6, the cutouts 216 are illustrated as interlocking with cassette alignment rods 126 affixed to the surface 123 of the carriage 121 of the loading station 120. Though the cutouts 216 are shown having triangular shapes, other shapes are contemplated including, but not limited to, rectangles, pentagons, and the like. In some embodiments, the plurality of cutouts 216 may only by located at the lateral sides 203 of the upper frame 210 and the lower frame 220. In some embodiments, there may not be a plurality of cutouts 216.

The upper and lower longitudinal members 212, 222 may comprise rotation apertures 218. The rotation apertures 218 may be configured to receive the prongs 119 of the rotation tool 115 as described herein. The rotation apertures 218 of the respective upper longitudinal members 212 may substantially align with one another to allow a prong 119 of the rotation tool 115 to pass therethrough. Similarly, the rotation apertures 218 of the lower longitudinal members 222 may be substantially aligned with one another to allow a prong 119 of the rotation tool 115 to pass therethrough. The rotation apertures 218 of the upper and lower longitudinal members 212, 222 may be substantially parallel to one another. In some embodiments, the rotation apertures 218 may instead be positioned within the vertical members 202 of the frame 201 such that the rotation tool 115 pierces the frame 201 of the cassette 200 along lateral sides 203 of the frame 201, such as shown in FIG. 4B.

Still referring to FIG. 10, coupled to the upper frame 210 are one or more support hooks 240 and one or more locking hooks 250. As described herein, the pick-up tool 112 may comprise one or more lift bars 114 to engage the hooks 250, 240 of the cassette 200. During pick-up the support hooks 240 may slidingly engage the one or more lift bars 114 of the pick-up tool 112. The locking hooks 250, due to the kinematic shape (e.g., a triangular shape) may align the cassette 200 onto the one or more bars in the appropriate alignment. As such, the cassette 200 may be substantially prevented from becoming misaligned on the pick-up tool 112 during transportation of the cassette 200 on the pick-up tool 112. The lower frame 220 may also have one or more support hooks 240 and one or more locking hooks 250. In this way, the cassette 200 may be reversible between the upper frame 210 and the lower frame 220. Though both the upper and lower frames 210, 220 are illustrated as having four hooks 250, 240, it is contemplated that a greater or fewer number of hooks 250, 240 may be utilized. In some embodiments, all the hooks 250, 240 may be locking hooks 250. In some embodiments, the hooks 250, 240 may be closed loop hooks instead of the open loop hooks illustrated.

Referring now to FIG. 11, the cassette 200 is shown loaded with a plurality of magazines 300 in the first portion 232 and the second portion 234 of the cassette 200. Hence the stacks of magazines 300 may be two magazines 300 wide in the longitudinal direction, y, and one magazine 300 wide in the lateral direction, x (see also FIG. 13). It is noted that though the magazines 300 are shown being stacked on top of one another in a horizontal arrangement relative to the first portion 232 and the second portion 234, the magazines 300 may instead be vertically aligned with one another within the cassette 200. As noted herein, during cooling, heat from a center of the cassette 200 may escape through the cooling channel 236. By providing such a cooling channel 236, cooling uniformity throughout the cassette 200 may be improved.

Figure 12:
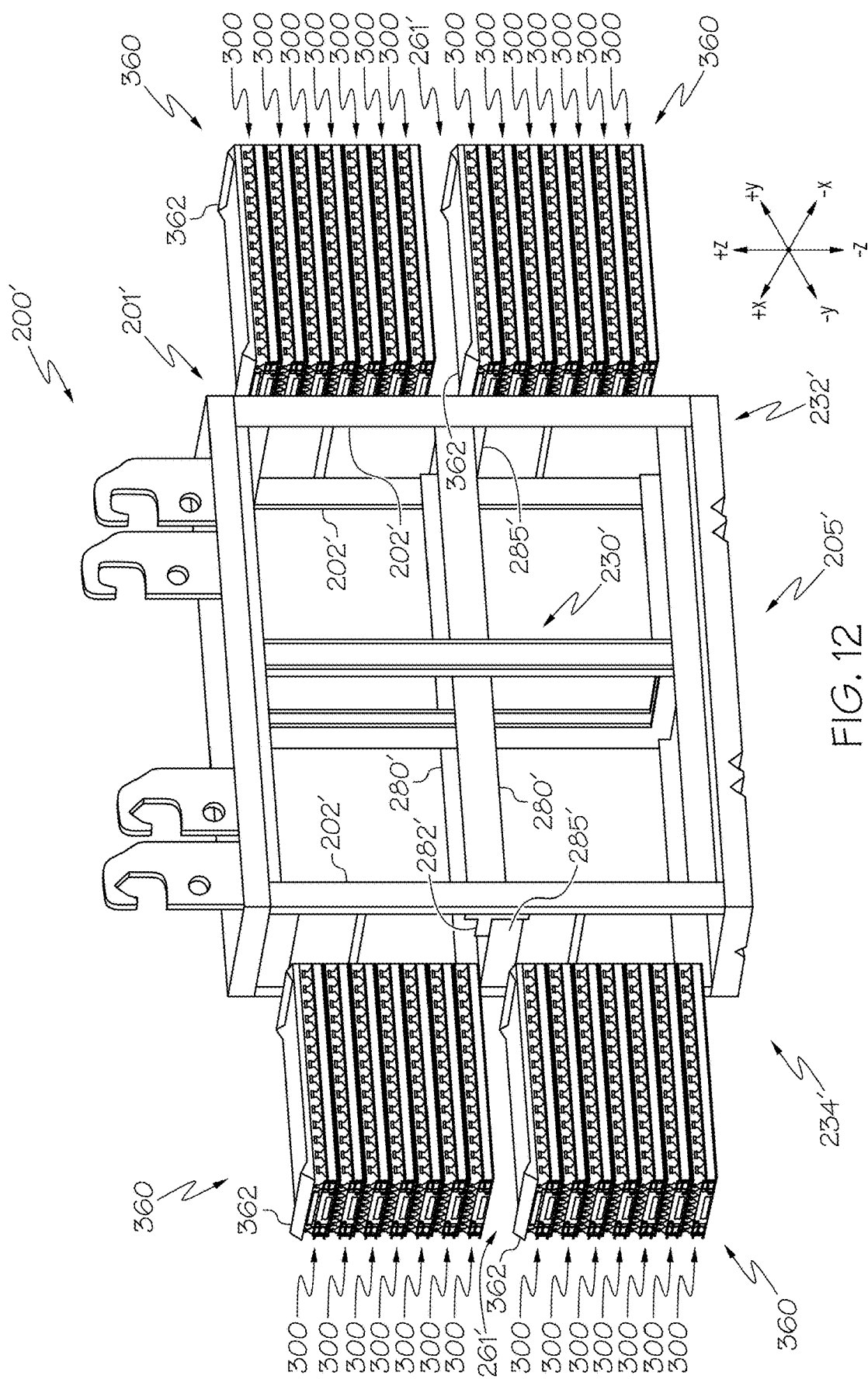
FIG. 12 illustrates a perspective view of a cassette and magazines displaced therefrom, according to one or more embodiments shown and described herein.

FIG. 12 illustrates an alternative embodiment of a cassette 200' wherein the stacks of magazines 360 are shown displaced from the first portion 232' and the second portion 234' of the frame 201'. In this embodiment, horizontal cross members 280' extend along the longitudinal sides 205' of the frame between the vertical members 202'. The horizontal cross members 280' may be configured to space at least a portion of the magazines 300 apart from a second portion of magazines 300. In this way, instead of a single stack of magazines 300 stacked within the first and second portions 232', 234', the magazines 300 may be separated into two short stacks 360 of magazines 300. In some embodiments, the horizontal cross member 280' may include a flange 282' that extends from the horizontal cross member toward a center of the cassette 200' such that a stack 360 of magazines 300 may rest on the flange 282'. Thus the stacks of magazines 300 may be vertically spaced from one another by a channel 261'. It has been found that a large number of magazines 300 stacked on top of one another may cause deformation to the magazines 300 at the bottom of the stack due to the weight of the magazines 300 stacked on top. Hence, by separating a single stack of magazines 300 into at least two short stacks 360, the weight applied to magazines 300 at the bottom of the stack may be alleviated. Though the illustrated embodiments show the stacks 360 of magazines 300 as having six magazines stacked on top of one another, in other embodiments, it is contemplated that a greater or fewer number of magazines may be stacked. In some embodiments, the channel 261' may provide an additional cooling channel through which heat from a center of the cassette 200' may escape, further improving cooling uniformity throughout the cassette 200'. In yet further embodiments, additional horizontal cross member 280' may be provided to further separate the stacks of magazines. In some embodiments, a lateral side member 285' may extend between the horizontal cross members 280' in the lateral direction, x. Such lateral side members 285' may provide additional support and rigidity to the frame 201' and the horizontal cross members 280'.

Atop of the various stacks 360 of magazines 300 may be retainers 362. The retainers 362 may be any device configured to fill in additional space between the frame 201' of the cassette 200' and the stacks 360 of magazines 300. In this way. The stacked up magazines 300 may be prevented from slipping vertically within the cassette 200' during rotations of the cassette 200'.

Figure 13:
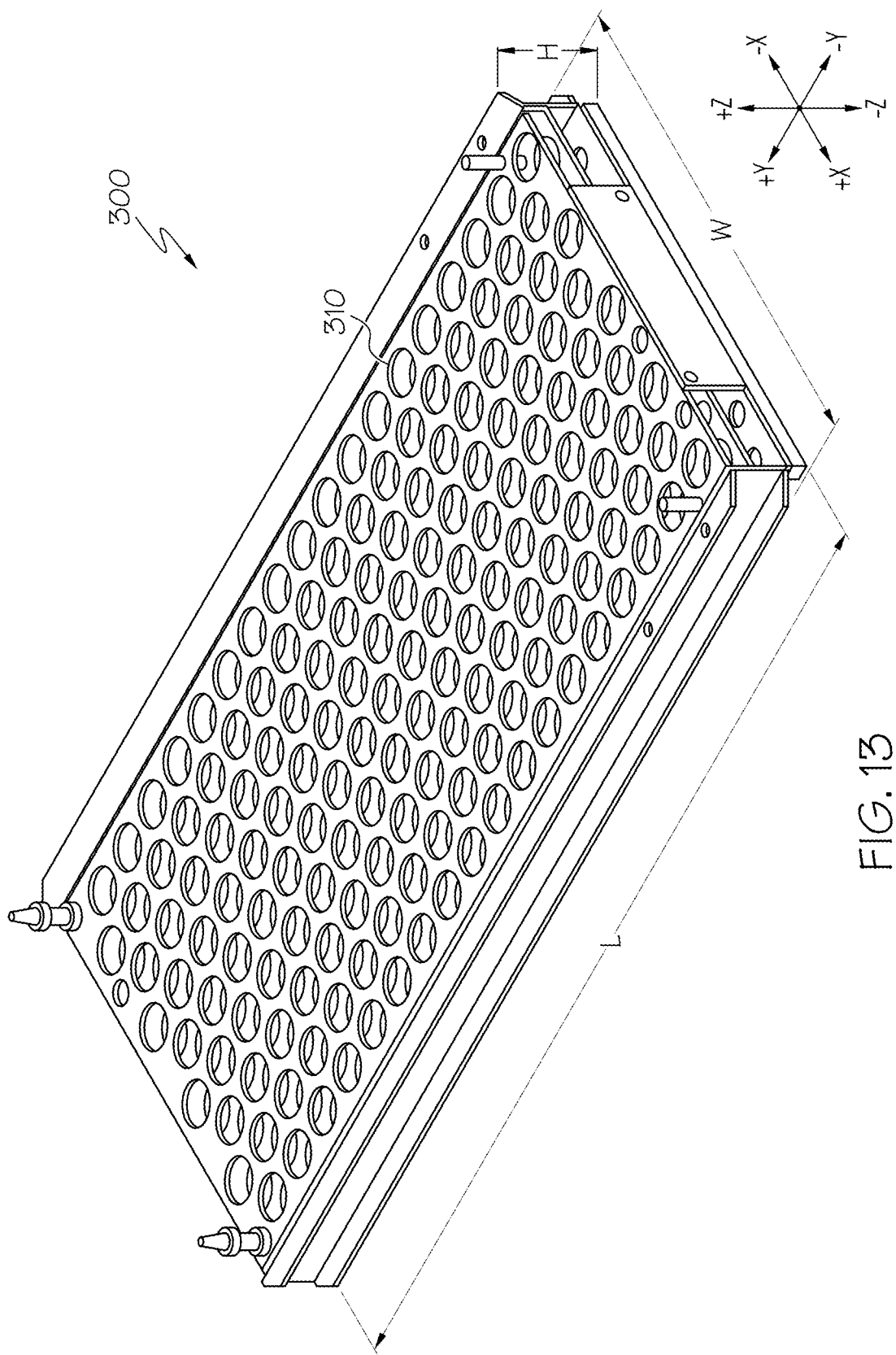
FIG. 13 illustrates a perspective view of a magazine of FIG. 11 in isolation, according to one or more embodiments shown and described herein.
Figure 14:
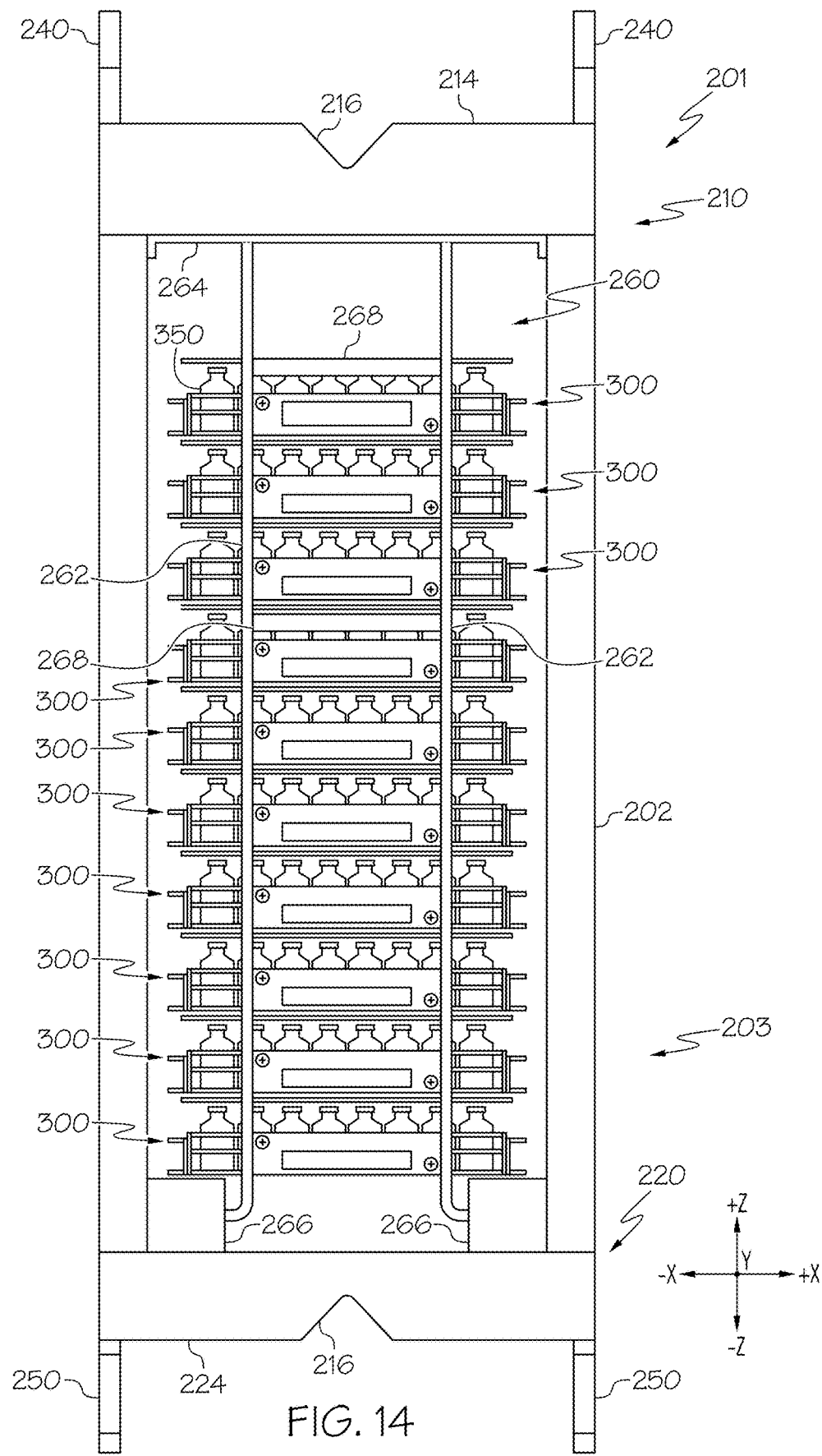
FIG. 14 illustrates a side view of the cassette of FIG. 11, according to one or more embodiments shown and described herein.

FIG. 13 illustrates a single magazine 300 in isolation. As depicted the magazine 300 has a plurality of apertures 310, which can be used to secure a plurality of glass articles 350. In some embodiments, the magazine 300 may be configured to secure about 200 glass articles 350, although other sized magazines are contemplated. In one embodiment, dimensions of the magazine 300 that may be appropriate herein are about 14 in. long (L), 7 in. wide (W), and 1.5 in. tall (H), although other sized magazines are also contemplated. In the embodiment illustrated in FIG. 11, a width of the magazine 300 or oriented in a direction parallel to the longitudinal side 205 of the cassette 200. Magazines 300 are described in detail in U.S. patent application Ser. No. 14/808,702 filed Jul. 24, 2015 entitled "Magazine Apparatuses for Holding Glass Articles During Processing" assigned to Corning, Incorporated; U.S. patent application Ser. No. 14/808,710 filed Jul. 24, 2015 entitled "Magazine Apparatuses for Holding Glassware During Processing" assigned to Corning, Incorporated; U.S. patent application Ser. No. 14/808,728 filed Jul. 24, 2015 entitled "Apparatus for Holding and Retaining Glass Articles" assigned to Corning, Incorporated; U.S. patent application Ser. No. 14/808,734 filed Jul. 24, 2015 entitled "Apparatuses for Holding and Retaining Glass Articles" assigned to Corning, Incorporated; and U.S. patent application Ser. No. 15/151,168 filed May 10, 2016 entitled "Apparatuses and Methods for Holding, Retaining, and/or Processing Glassware Articles" assigned to Corning incorporated, each of which are herein incorporated by reference in their entireties.

It is noted that in some embodiments, the plurality of glass articles 350 contained within the one or more magazines 300, may be formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments, the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition.

In one particularly exemplary embodiment, the plurality of glass articles 350 may be formed from an ion exchangeable glass composition described in granted U.S. Pat. No. 8,980,777 filed Oct. 25, 2012 entitled "Glass Compositions with Improved Chemical and Mechanical Durability" assigned to Corning, Incorporated, which is incorporated by reference in its entirety.

However, it should be understood that the glass articles 350 subject to the present disclosure may be formed from other glass compositions including, without limitation, ion exchangeable glass compositions and non-ion exchangeable glass compositions. For example, in some embodiments, the glass article 350 may be formed from Type 1B glass compositions such as, for example, Schott Type 1B aluminosilicate glass.

In some embodiments described herein, the glass articles 350 may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses, but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85\times10^{-7\circ}$ $C.^{-1}$.

The plurality of glass articles may take on a variety of different forms. For example, the plurality of glass articles include vials, ampoules, cartridges, syringe bodies and/or any other glass container for storing pharmaceutical compositions.

Referring now to FIG. 13, a lateral side 203 of the cassette 200 is depicted. The lateral sides 203 of the cassette 200 may be substantially identical to one another. A retaining structure 260 may be removably secured to the lateral side 203 of the cassette 200 and extend vertically between the lower lateral member 224 to the upper lateral member 214. In this embodiment, the retaining structure 260 includes two retaining bars 262 extending from an alignment member 264 sized and shaped to fit between the vertical members 202 of the cassette 200. The two retaining bars 262 extend from the alignment member 264 and are inserted into pockets 266 coupled to the lower lateral member 224. In this way, the two retaining bars 262 secure the magazines 300 within the cassette 200. In some embodiments, one or more supports 268 may extend between the two retaining bars 262. The one or more supports 268 may provide additional rigidity to the retaining structure 260.

Various experiments have been performed to test the slice cassette concept described above. To test the slice cassette concept, three magazines, such as shown in FIG. 12, were stacked on top of each other and used as a surrogate for evaluation of the slice cassette concept.

Conventional Cassette Cooling Times

Figure 15:
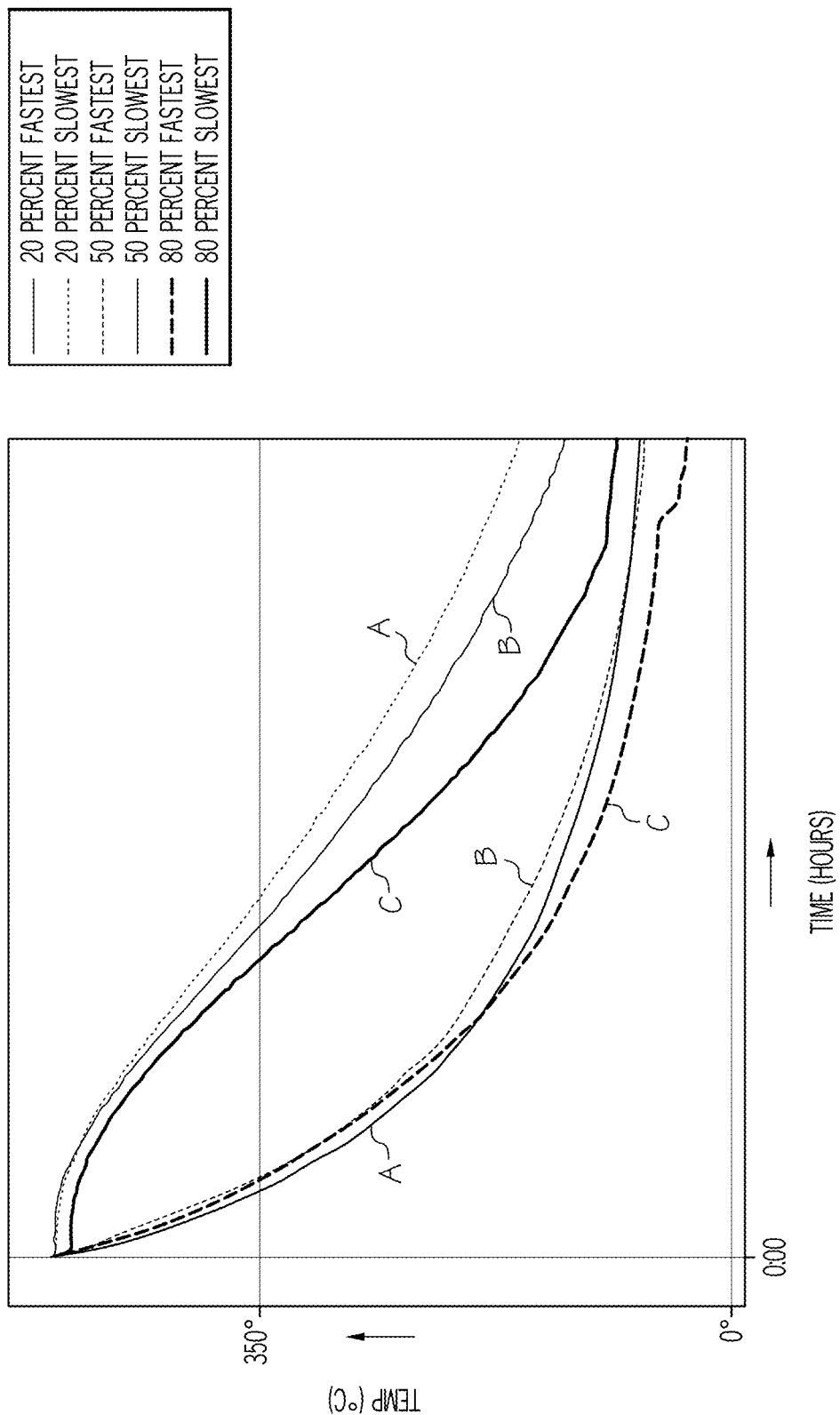
FIG. 15 illustrates a cooling profile of a conventional cassette such as depicted in FIGS. 8A and 8B.

Referring to FIG. 15, a cooling profile of three conventional cassettes (A, B, and C), such as shown in FIGS. 8A and 8B, during various cooling operations after being subjected to an ion exchange process is illustrated. Each of the conventional cassettes (A, B, and C) was subjected to an ion exchange bath at above 400° C. (e.g., between about 450° C.-about 510° C.) for 5 hours. The conventional cassettes tested had dimensions of 1.5×1.5×1.5 m. Thermocouples were wired to the surface of the plurality of glass articles in range of locations. The thermocouples allowed for temperature monitoring during cooling. As illustrated, exterior temperatures taken from glass articles located near the exterior of the conventional cassette are compared to interior temperatures taken from glass articles located toward an interior of the conventional cassette. In each experiment, the conventional cassette was cooled in a contained chamber with cooling fans circulating room temperature air. The fan speeds were run at 20% the maximum fan speed corresponding to conventional cassette A, 50% the maximum fan speed corresponding to conventional cassette B, and 80% the maximum fan speed corresponding to conventional cassette C. The results are tabulated below:

TABLE 1

Cooling Time of Glass Articles in Conventional Cassette

| Conventional Cassette | Fan Speed | Interior Cooling Time to below 350° C. (Hours:Minutes) | Exterior Cooling Time to below 350° C. (Hours:Minutes) |
| --- | --- | --- | --- |
| A | 20% | 1:21 | 0:15 |
| B | 50% | 1:14 | 0:18 |
| C | 80% | 1:06 | 0:17 |

As shown in Table 1 above, the interior cooling time of the conventional cassette in each of the tests was above an hour while the exterior cooling time of the conventional cassette was under 20 minutes depending on the fan speed. This results in a large discrepancy in the thermal experience of the glass articles located in the interior of the conventional cassette versus the exterior of the conventional cassette. In order to quantify the difference between glass articles cooled faster at the edges of the conventional cassette versus glass articles located toward a center of the conventional cassette and therefore subjected to longer cooling periods, the surface compression of the ion exchanged articles at the center of the conventional cassettes were compared with those at the edges. A maximum part range of about 130 MPa (e.g., between about 115 MPa-about 140 MPa) (nominal of 400

MPa) was observed between the interior and the exterior glass articles. An average range of surface compression from the interior to the exterior of the conventional cassettes was found to be 70 MPa (e.g., between about 60 MPa-about 80 MPa).

Slice Cassette Concept Cooling Time

Figure 16:
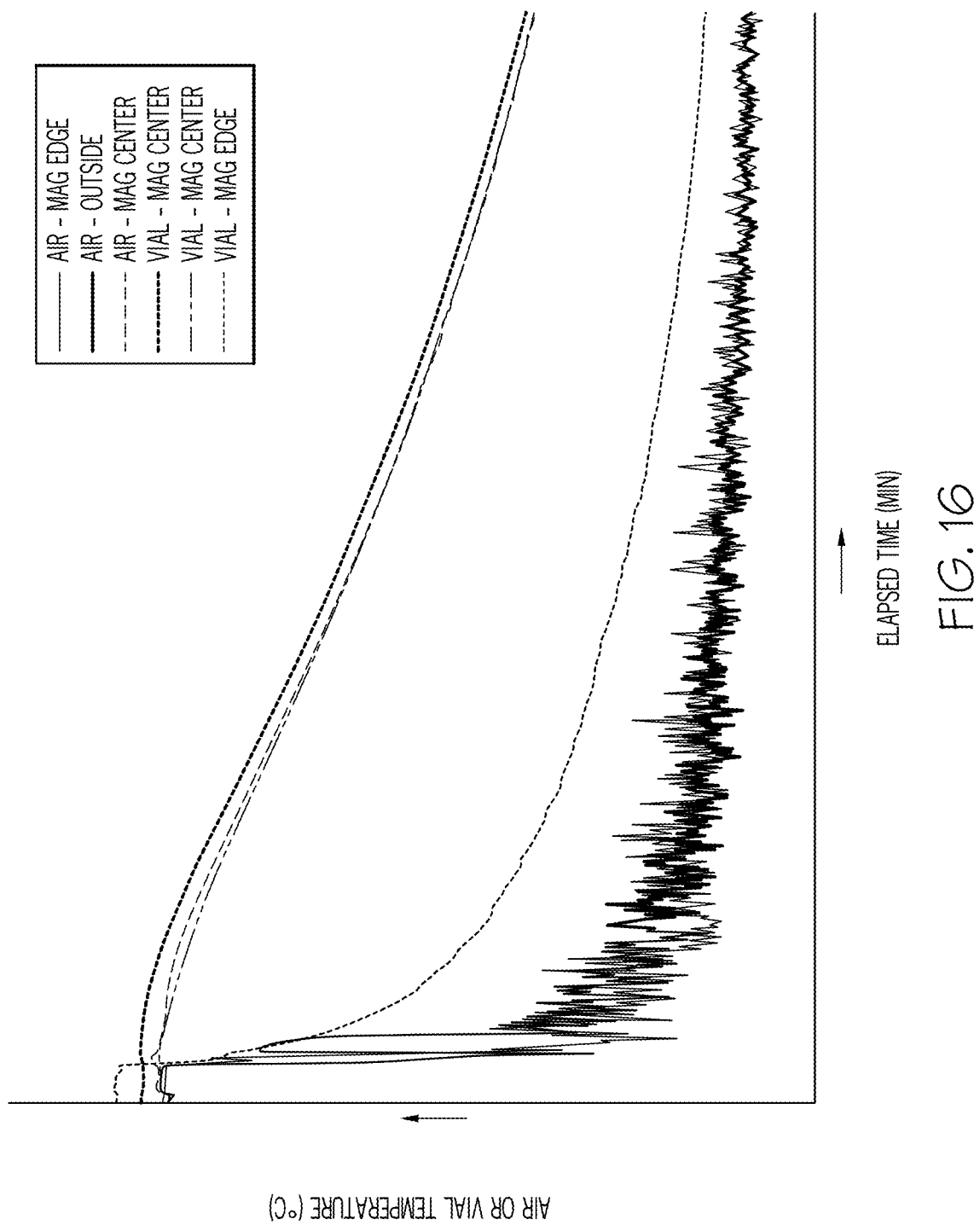
FIG. 16 illustrates a cooling profile of a stack of three magazines corresponding to a slice cassette concept, according to one or more embodiments shown and described herein.

Referring now to FIG. 16, a cooling profile of a slice cassette concept during a cooling operation after being subjected to the same ion exchange process as the conventional cassette is illustrated. As noted hereinabove, the slice cassette concept was simulated by stacking and fastening together three magazines, such as illustrated in FIG. 13, as a surrogate. The surrogate is representative of a slice cassette concept because the smallest dimension may be comparable to the smallest dimension of a single stack of magazines in a slice cassette concept. The surrogate did not receive any active cooling. That is, no fan was used to help cool the surrogate. As shown in FIG. 16, changes in air temperature around and within the magazine are plotted along with changes in the temperature of the glass articles within the surrogate, in this case vials. The table below illustrates the difference in cooling time experienced toward a center of the surrogate versus an edge of the surrogate.

TABLE 2

| Cooling Time of Glass Articles in Surrogate | |
|---|---|
| Exterior Cooling Time to about 350° C. | Interior Cooling Time to about 350° C. |
| Less than 3 minutes | About 13 minutes |

As shown in Table 2 above, the interior cooling time for glass articles located toward a center of the surrogate was about 13 minutes, while the exterior cooling time for glass articles located toward an edge of the surrogate was about less than 3 minutes. The interior of the surrogate had a cooling rate of about 10° C./min (e.g., between about 5° C./min-about 15° C./min). and the exterior of the surrogate experienced a cooling rate of about 16 times the cooling rate of the interior of the surrogate (e.g., between about 115° C./min-about 140° C./min). This represents a substantial reduction in cooling time versus that of a conventional cassette. The CS range of glass articles within the surrogate was also compared. The maximum range of CS from the interior of the surrogate to the exterior was about 40 MPa (e.g., between about 35 MPa-about 45 MPa). The average difference in CS between glass articles located toward the interior versus toward the exterior of the surrogate was found to be about 10 MPa (e.g. between about 5 MPa-about 15 MPa). Furthermore, in an experiment where active cooling was used, cooling time could be reduced to about 1 minute.

Figure 17A:
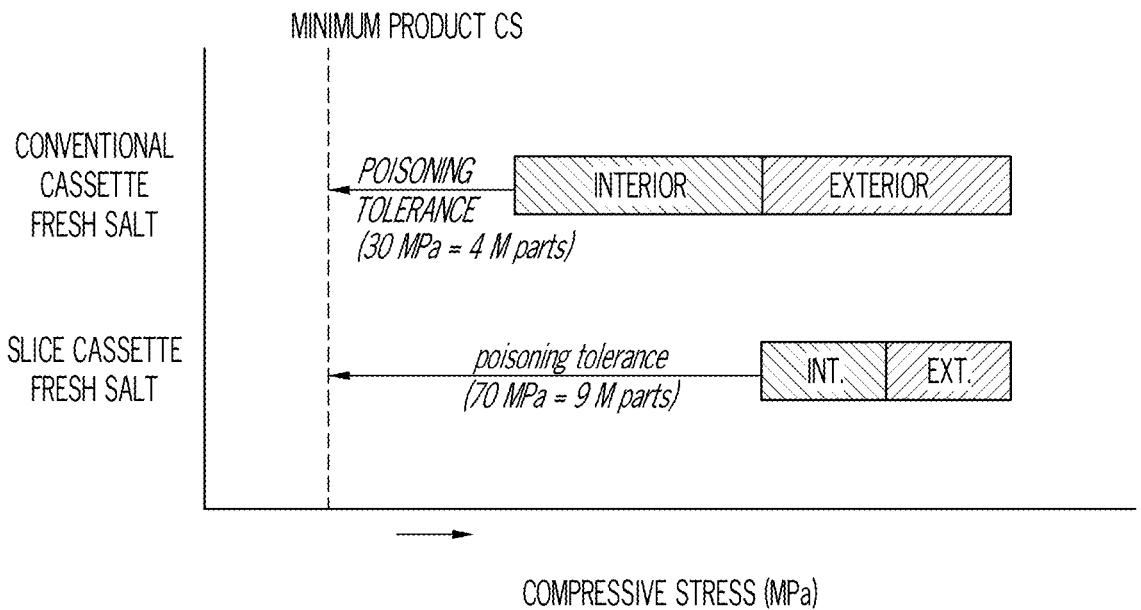
FIG. 17A illustrates conventional cassette compressive stresses during typical ion exchange processing versus slice cassette concept compressive stresses under the same ion exchange processing parameters.

As noted herein above, compressive stresses achievable by ion exchange become less as the molten salt bath is poisoned with exchanged ions from the plurality of glass articles. By using the slice cassette concept described herein, the life of the molten salt bath can be extended. Referring to FIG. 17A, a chart illustrating the poisoning tolerances and the range of CS achieved through ion exchange are depicted for both a conventional cassette and the slice cassette concept subjected to the same ion exchange processing. It appears that the bounds of CS for the slice cassette concept provide tighter tolerance versus the bounds of CS for the conventional cassette. A tight CS capability within the allowable CS range helps extend the life of the salt. For example, the slice cassette concept allows for an additional about 40 MPa range (e.g. between about 30 MPa-about 50 MPa) for poisoning over the about 30 MPa range for poisoning accepted by the conventional cassette. Thus, for every 7.5 MPa of CS range that is reduced on the low end (e.g. toward to center of the cassette) an additional 1 million parts can be processed before the salt may need to be changed.

Figure 17B:
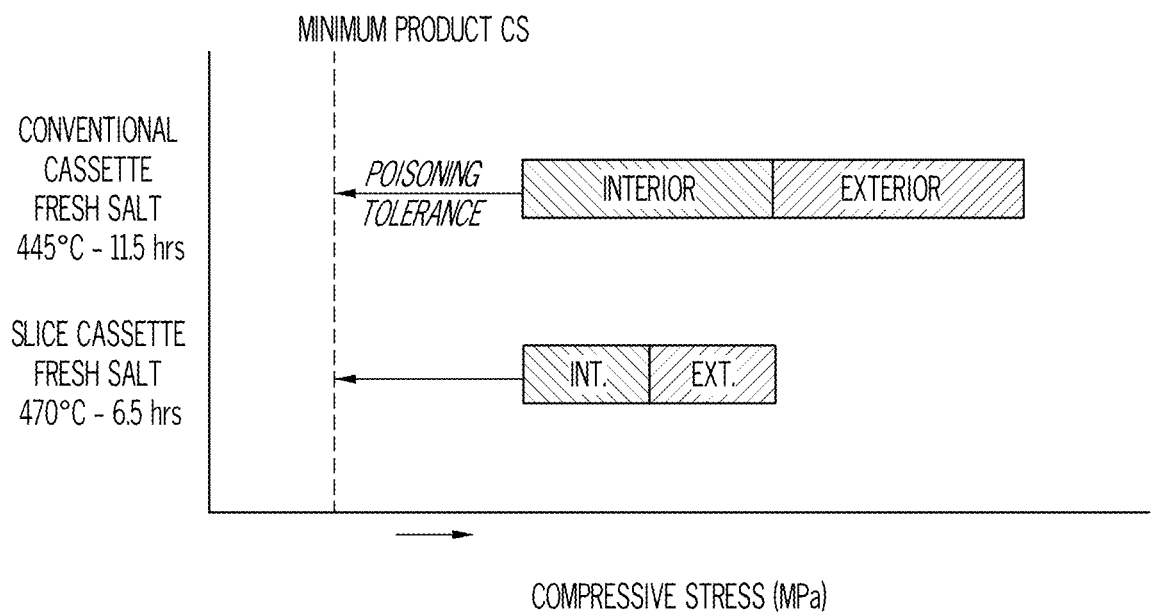
FIG. 17B illustrates conventional cassette compressive stresses during typical ion exchange processing versus slice cassette concept compressive stresses during ion exchange processing having an increased temperature and decreased time.

Referring now to FIG. 17B, the improved CS range of the slice cassette concept may also be leveraged to reduce cycle time for ion exchange processing. For example, the temperature of the molten salt bath may be increased. When the temperature of the molten salt bath is increased, ion exchange occurs exponentially faster. However, structural relaxation can occur resulting in a loss of CS compared to ion exchange at lower temperatures. The rate of CS loss versus temperature may be, for some types of glass, between about 1.5 MPa/° C. to 1.6 MPa/° C. between about 450° C. and 530° C. Hence, a conservative estimate ratio of CS loss versus temperature may be about 1.6 MPa/° C. Multiplying this ratio by the additional MPa range for poisoning garnered by using the slice cassette concept, an appropriate temperature increase can be determined to be approximately 25° C. Hence, while the conventional cassette can be processed at 445° C. for 11.5 hours to achieve the desired CS, the slice cassette concept can be processed at 470° C. for about 6.5 hours and still be within range of allowable CS.

Figure 18:
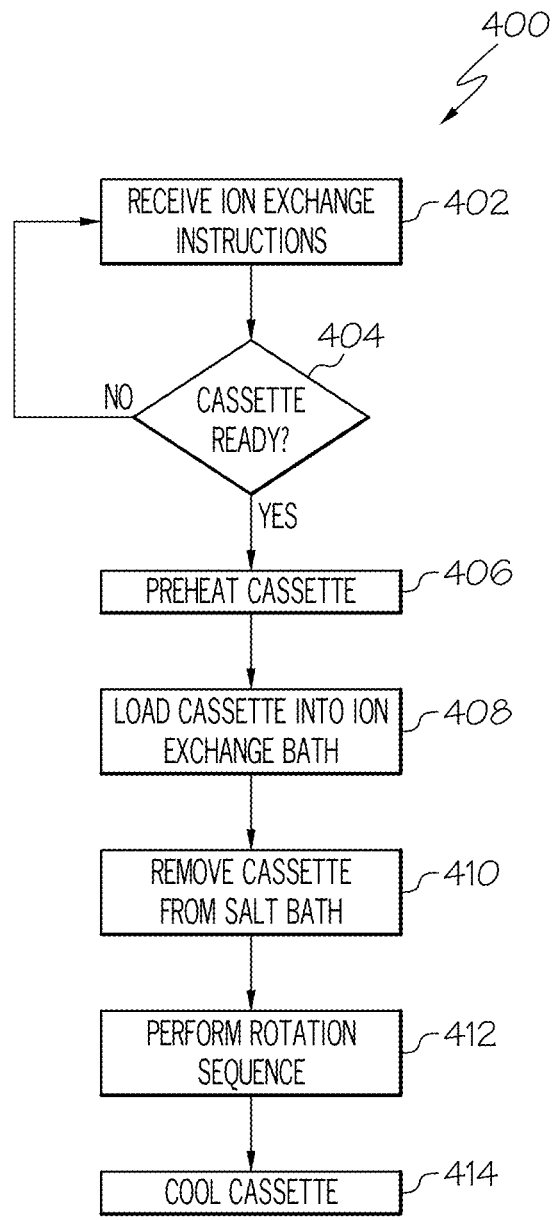
FIG. 18 illustrates a method of ion exchange according to one or more embodiments shown and described herein.
Figure 19:
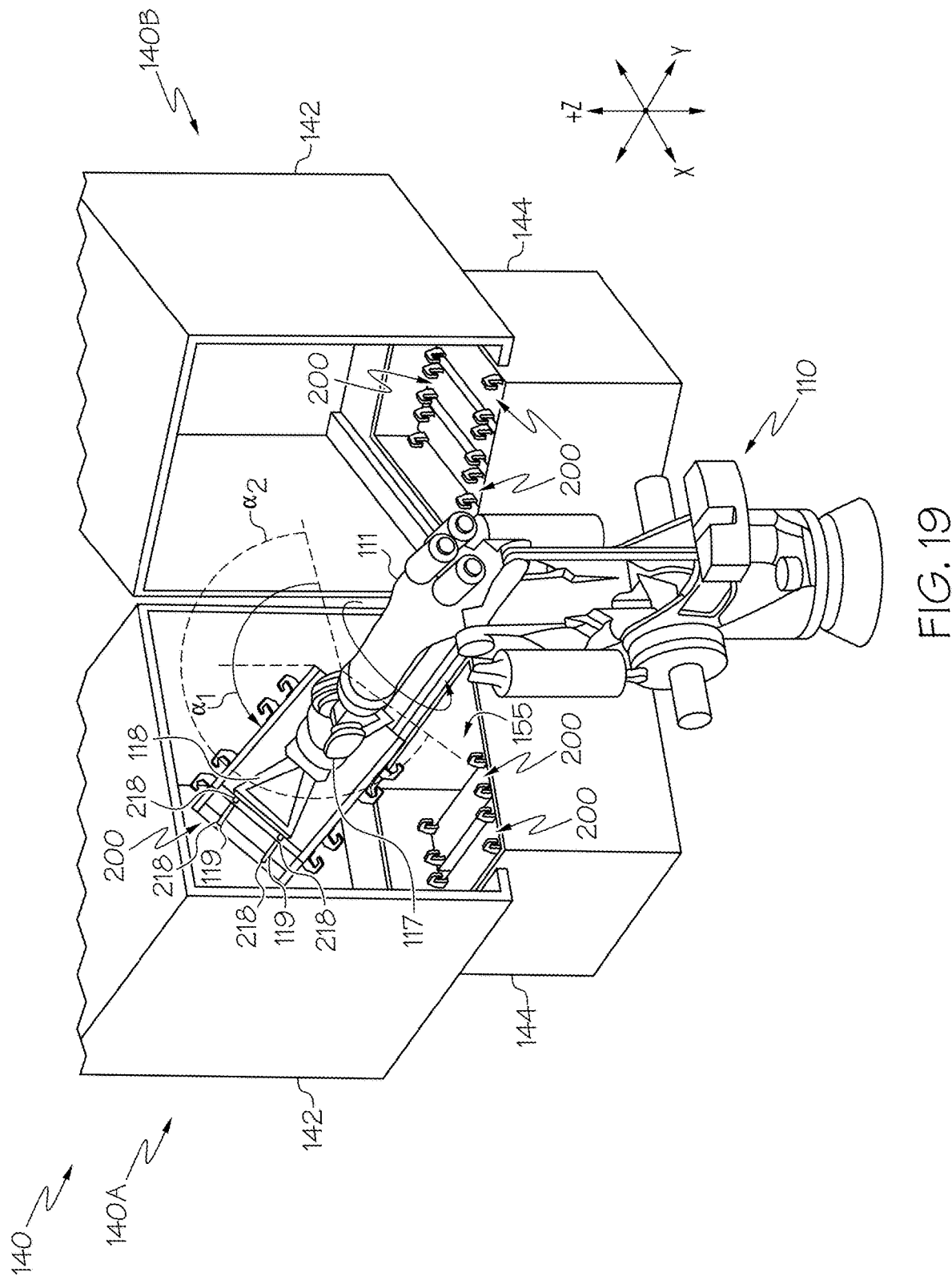
FIG. 19 illustrates the rotation of a cassette, according to one or more embodiments shown and described herein.

Referring now to FIG. 18, a method 400 for processing one or more glass articles according to the concepts discussed herein is illustrated. Referring also to FIG. 1, to begin, the control unit 103 receives processing instructions (block 402) from either the one or more memory modules 106 or from the user input device 107 as discussed herein. The processing instructions may include such information as processing steps (e.g., preheating, ion exchange, cooling, rinsing, etc.), processing time for each of the processing steps, and temperatures for steps wherein the temperature may be adjusted (e.g., preheating and ion exchange). After receiving processing instructions, the system 100 may determine if a cassette 200 is prepared for processing. For example, and not as a limitation, the system 100 may determine, based on a cassette signal output by one or more cassette sensors 180, that a cassette 200 is waiting on the carriage 121 at the loading station 120, such as shown in FIG. 6. In embodiments comprising a motorized carriage 121 as described herein, the one or more processors 105 of the control unit 103 may execute logic stored on the one or more memory modules 106 to cause the carriage 121 to move along the rails 128, 129 toward the processing cell 108, as shown in FIG. 2. A cassette 200 may be considered prepared for processing when it is loaded with a plurality of magazines 300 holding a plurality of glass articles, such as shown in FIG. 11.

Once it is determined that the cassette 200 is ready to be processed, the control unit 103 may cause, through logic executed by the one or more processors 105, the robotic lift 110, having a pick-up tool 112 attached thereto, to lift the cassette 200 from the loading station 120. In some embodiments, wherein the robotic lift 110 has the rotation tool 115 attached thereto when instructions are received to lift a cassette 200, the control unit 103 may cause the robotic lift 110 to drop off the rotation tool 115 at the tool station 190, such as illustrated in FIG. 5, and attach the pick-up tool 112 to the arm 111 of the robotic lift 110.

Once the robotic lift 110 engages the cassette 200, the robotic lift 110 may transfer the cassette 200 to one of the processing stations. For example, if the processing instructions require a pre-heat step, the robotic lift 110 may automatically load the cassette 200 within the pre-heat furnace 132 of the pre-heat station 130 for pre-heating (block 406), as described herein. In some embodiments there may not be a pre-heating step.

After the pre-heating step (block 406) has been completed, or in embodiments where there is not a pre-heating step, the control unit 103 may cause the robotic lift 110 to lift the cassette 200 and automatically load the cassette 200 within a molten salt bath 155 of the one of the one or more ion exchange stations 140 (block 408). The cassette 200 may be left in the molten salt bath 155 of the ion exchange station 140 for a predetermined period of time. The predetermined period of time may be based on the desired DOL. For example, an appropriate DOL is about 60 μm to about 75 μm. In some embodiments, appropriate DOL may be about 65 μm to about 70 μm. After the predetermined period of time, the control unit 103 may cause the robotic lift 110 to automatically remove the cassette 200 from the ion exchange station 140 (block 410). It is noted that wherein the cassette 200 is in accordance with the slice cassette concept described herein, one or more cassettes 200 may be processed at a given time. Moreover, each of one or more cassettes 200 within the one or more ion exchange stations 140 may be individually manipulated by the robotic lift 110. Hence, with reference to FIGS. 9A and 9B each of the one or more cassettes 200 may be individually loaded into and removed from the molten salt bath 155 and may be reconfigurable relative to one another such that processing of various cassettes 200 may occur simultaneously. Each of the one or more cassettes 200 may therefore be individually removed from the molten salt bath 155 after a predetermined period of time appropriate for each of the one or more cassettes 200.

Referring also to FIG. 18, upon lifting the cassette 200 from the molten salt bath 155, the control unit 103 may cause the robotic lift 110 to automatically perform a rotation sequence (block 412). The rotation sequence may include rotating the cassette about a predetermined axis. In some embodiments, the cassette may be rotated around multiple axes. In some embodiments, the rotation sequence may stop at predetermined locations to drain fluid from the cassette 200. In embodiments wherein the rotation tool 115 is attachable to the arm 111 of the robotic lift 110, the control unit 103 may cause the robotic lift 110 to automatically release its pick-up tool 112 at the tool station 190 and attach the rotation tool 115 to the arm of the robotic lift 110. To load the cassette 200 onto the rotation tool 115, the prongs 119 of the rotation tool 115 may pierce the rotation apertures 218 of the cassette 200 to secure the cassette 200 onto the rotation tool 115. The rotation tool 115 may then automatically rotate the cassette 200 to substantially drain any remaining fluid of the molten salt bath 155 from the cassette 200. In some embodiments, the robotic lift 110 may drain the cassette 200 over the molten salt bath 155 by performing a rotation sequence to rotate the cassette 200 360° C. about a horizontal axis (y). The rotation sequence may include rotating the cassette 200 to a first predetermined angle, $\alpha_1$, and holding the cassette 200 there for a predetermined time before rotating the cassette 200 to a second predetermined angle, $\alpha_2$. For example, the first predetermined angle, $\alpha_1$, may about 125° about the horizontal axis (y) and the second predetermined angle, $\alpha_2$, may be about 225° about the horizontal axis (y). The predetermined time at which the cassette 200 is held at a predetermined angle may be any time sufficient to drain fluid from the cassette 200, for example, less than about 5 minutes, less than about 3 minutes, less than about 1 min, etc. In some embodiments, the time sufficient to substantially drain fluid from the cassette 200 may be dependent on the size of the cassette 200 and the types of glass articles contained therein. For example, shallow glass articles may take less time to drain than deeper glass articles.

As illustrated in FIG. 7 and described herein, the rotation tool 115 may be incorporated into a side wall 143 of a hood 142 of the one or more ion exchange stations 140. In such embodiments, a similar rotation sequence may occur about an axis of the rotation tool 115. In this embodiment, the robotic lift 110 may lift the cassette 200 with the pick-up tool 112, align the rotation apertures 218 of the cassette 200 with the prongs 119 of the rotation tool 115, place the cassette 200 onto the prongs 119 of the rotation tool 115, and rotate the cassette 200, as described herein. Because the rotation tool 115 is offset from the molten salt bath 155, as described hereinabove, the robotic lift 110 may be free to remove or add other cassettes 200 to the molten salt bath 155. In such embodiments each of the cassettes 200 may be individually loaded onto the rotation tool 115 for draining, while the remaining cassettes 200 are free to continue processing. After the cassette 200 has been drained, the robotic lift 110 may place the cassette 200 into additional ion exchange stations 140 of the one or more ion exchange stations 140 in correspondence with the processing instructions. Similar rotation sequences may be performed for each subsequent ion exchange station 140. In other embodiments, at subsequent ion exchange stations 140, the cassette 200 may be inserted upside down (i.e., the glass articles 350 are upside down), such that the need to drain fluid from the cassette 200 is minimized.

Once finished processing at the one or more ion exchange stations 140, the cassette 200 may be cooled (block 414). As such, the one or more processors 105 of the control unit 103 may execute logic to automatically transport, with the pick-up tool 112, the cassette 200 from the one or more ion exchange stations 140 and load the cassette 200 into the cooling station 160, such as illustrated in FIG. 2. The cooling station 160 may then cool the cassette 200 to a predetermined temperature. A predetermined temperature may be any temperature less than or equal to a temperature wherein structural relaxation is negligible, for example about 350° C. The temperature of the cassette may cool to a temperature of less than or about 200° C. in about less than 30 minutes, about less than 10 minutes, and about less than 5 minutes. As described herein, the cassette 200 may have a longitudinal side 205 and a narrower lateral side 203, as well as cooling channel 236 to improve air flow and natural convection leading to the above described cooling times.

In some embodiments, upon cooling, or before cooling step (414) the cassette may be rinsed at the one or more rinsing stations 170. For example, the control unit 103 can cause the robotic lift 110 to load the cassette 200 automatically into a rinse station, wherein the cassette 200 can be rinsed to substantially remove remaining residue from the molten salt bath 155.

It should now be understood that systems and methods according to the present disclosure may use a control unit to control a robotic lift to quickly move cassettes around a processing cell to the various processing stations. The high speed robotic lift may eliminate the need to insert, extract, and rotate a cassette into an actively heated chamber for transportation as is often done in the prior art. Further, the slice cassette concept discussed herein may lengthen salt life and allow several ion exchange processes to occur simultaneously. For instance several cassettes each having different processing requirements (e.g., time) may be processed at once in a single molten salt bath for more efficient use of a molten salt bath. By allowing more cassettes in a single molten salt bath a more constant flow through the various processing stations may be achieved. For example, a cassette according to embodiments disclosed here may be processed very hour, wherein a large cassette may require 4 hours. Furthermore, the cassettes as described herein may increase packaging efficiency of parts with a salt bath and minimize surface area to reduce salt dragout. Moreover, by providing cooling channels as described herein, air flow through the cassettes and natural convection may be improved. The slice cassette concept may further reduce size, capital cost, and process time for processes including but not limited to cooling, pre-heating, and washing. The slice cassette concept also reduced the load (e.g. cost/size) required for the robotic lift to handle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for ion exchanging glass articles, the method comprising:
   receiving processing instructions from one or more user input devices;
   loading a cassette containing a plurality of glass articles into a molten salt bath of an ion exchange station automatically with a robotic lift based on the processing instructions;
   removing the cassette from the molten salt bath automatically with the robotic lift after a predetermined time based on the processing instructions; and
   rotating the cassette automatically with a rotation tool coupled to one of the robotic lift and a cover of the ion exchange station to drain fluid of the molten salt bath from the cassette.

2. The method of claim 1, wherein rotating the cassette automatically to drain the fluid of the molten salt bath from the cassette comprises rotating the cassette around an axis and stopping rotation at a predetermined location.

3. The method of claim 1, wherein rotating the cassette automatically to drain the fluid of the molten salt bath from the cassette comprises:
   attaching the rotation tool onto an arm of the robotic lift;
   loading the cassette on to the rotation tool; and
   initiating a rotation sequence with the rotation tool to rotate the cassette.

4. The method of claim 3, wherein the rotation sequence comprises:
   rotating the cassette about 125° relative to a horizontal axis and holding the cassette at about 125° relative to the horizontal axis for a predetermined period of time; and
   rotating the cassette 225° relative to the horizontal axis and holding the cassette at about 225° relative to the horizontal axis for a predetermined period of time.

5. The method of claim 1, wherein rotating the cassette automatically to drain the fluid of the molten salt bath from the cassette comprises:
   loading the cassette onto the rotation tool, wherein the rotation tool is coupled to the cover of the ion exchange station; and
   initiating a rotation sequence with the rotation tool to rotate the cassette wherein the rotation sequence comprises:
      rotating the cassette about 125° relative to a horizontal axis and holding the cassette at about 125° relative to the horizontal axis for a predetermined period of time; and
      rotating the cassette 225° relative to the horizontal axis and holding the cassette at about 225° relative to the horizontal axis for a predetermined period of time.

6. The method of claim 1, wherein the fluid of the molten salt bath is drained from the cassette and back into the molten salt bath.

7. The method of claim 1, further comprising:
   loading the cassette automatically into a pre-heat station with the robotic lift; and
   pre-heating the cassette in a pre-heat furnace of the pre-heat station to a predetermined temperature.

8. The method of claim 1, further comprising:
   loading the cassette automatically into a cooling station with the robotic lift; and
   cooling a temperature of the cassette.

9. The method of claim 1, further comprising:
   loading the cassette automatically into a rinse station with the robotic lift; and
   rinsing the cassette to substantially remove remaining residue from the molten salt bath.

10. A system for ion exchanging glass articles, the system comprising:
    one or more processors;
    a robotic lift communicatively coupled to the one or more processors and configured to manipulate a cassette, wherein the cassette is configured to secure a plurality of glass articles; and
    one or more memory modules communicatively coupled to the one or more processors that store logic that when executed by the one or more processors cause the one or more processors to:
       automatically load the cassette into a molten salt bath of an ion exchange station with the robotic lift;
       automatically remove the cassette from the molten salt bath with the robotic lift after a predetermined time; and
       automatically rotate the cassette with a rotation tool coupled to one of the robotic lift and a cover of the ion exchange station to drain fluid of the molten salt bath from the cassette based on processing instructions.

11. The system of claim 10, wherein to automatically rotate the cassette with the robotic lift to drain the fluid of the molten salt bath from the cassette, the one or more processors execute logic to:
    automatically attach the rotation tool onto an arm of the robotic lift;
    load the cassette onto the rotation tool; and
    initiate a rotation sequence with the rotation tool to rotate the cassette.

12. The system of claim 11, wherein the rotation sequence comprises:
 rotating the cassette to about 125° relative to a horizontal axis and holding the cassette at about 125° relative to the horizontal axis for a predetermined period of time; and
 rotating the cassette to about 225° relative to the horizontal axis and holding the cassette at about 225° relative to the horizontal axis for a predetermined period of time.

13. The system of claim 10, wherein the fluid of the molten salt bath is drained from the cassette and back into the molten salt bath.

14. The system of claim 10, further comprising a pre-heat station communicatively coupled to the one or more processors, wherein the one or more processors execute logic to:
 load the cassette automatically into the pre-heat station with the robotic lift; and
 pre-heat the cassette in a pre-heat furnace of the pre-heat station to a predetermined temperature.

15. The system of claim 10, further comprising a cooling station communicatively coupled to the one or more processors, wherein the one or more processors execute logic to:
 load the cassette automatically into the cooling station with the robotic lift; and
 cool a temperature of the cassette.

16. The system of claim 10, wherein the one or more processors execute logic to cause the robotic lift to automatically load the cassette into a rinse station to rinse residue of the molten salt bath from the cassette.

17. The system of claim 10, wherein the one or more processors execute logic to:
 load additional cassettes into the molten salt bath with the robotic lift; and
 each cassette is reconfigurable relative to the other cassettes within the molten salt bath.

18. A method for ion exchanging glass articles, the method comprising:
 loading a plurality of glass articles within a plurality of cassettes;
 individually loading each cassette of the plurality of cassettes into a molten salt bath in a side-by-side arrangement, wherein the plurality of cassettes are reconfigurable relative to one another;
 individually removing each cassette of the plurality of cassettes from the molten salt bath after a predetermined time; and
 individually rotating each cassette of the plurality of cassettes to drain fluid of the molten salt bath from the plurality of cassettes.

19. The method of claim 18, wherein rotating each cassette of the plurality of cassettes automatically to substantially drain the remaining fluid of the molten salt bath from each of the plurality of cassettes comprises:
 attaching a rotation tool onto an arm of a robotic lift;
 loading each cassette of the plurality of cassettes individually onto the rotation tool; and
 initiating a rotation sequence with the rotation tool to rotate the each cassette of the plurality of cassettes.

20. The method of claim 18, wherein the rotation sequence comprises:
 rotating each cassette of the plurality of cassettes to about 125° relative to a horizontal axis and holding each cassette of the plurality of cassettes at about 125° relative to the horizontal axis for a predetermined period of time; and
 rotating each cassette of the plurality of cassettes to about 225° relative to the horizontal axis and holding each cassette of the plurality of cassettes at about 225° relative to the horizontal axis for a predetermined period of time.

21. The method of claim 18, wherein rotating each cassette of the plurality of cassettes automatically to substantially drain the remaining fluid of the molten salt bath from each cassette of the plurality of cassettes comprises:
 loading each cassette of the plurality of cassettes individually onto a rotation tool, wherein the rotation tool is coupled to a cover of the one or more ion exchange stations; and
 initiating a rotation sequence with the rotation tool to rotate each cassette of the plurality of cassettes wherein the rotation sequence comprises:
  rotating each cassette of the plurality of cassettes about 125° relative to a horizontal axis and holding each cassette of the plurality of cassettes at about 125° relative to the horizontal axis for a predetermined period of time; and
 rotating each cassette of the plurality of cassettes 225° relative to the horizontal axis and holding each cassette of the plurality of cassettes at about 225° relative to the horizontal axis for a predetermined period of time.

22. A method of ion exchanging glass articles, the method comprising:
 loading a plurality of glass articles within a magazine;
 loading the magazine into a cassette, wherein the cassette comprises a frame comprising a lateral side and a longitudinal side, wherein the lateral side has a length in a lateral direction that is less than a length of the longitudinal side in a longitudinal direction;
 loading the cassette with the magazine positioned therein into a molten salt bath in a side-by side arrangement relative to other cassettes positioned within the molten salt bath, wherein the cassette is configured to be reconfigurable relative to the other cassettes positioned within the molten salt bath such that movement of the cassette relative to the other cassettes positioned within the molten salt bath does not disturb a position of the other cassettes positioned within the molten salt bath.

23. The method of claim 22, further comprising removing the cassette from the molten salt bath after a predetermined period of time, wherein the cassette is configured to be removed from the molten salt bath separately from the other cassettes within the molten salt bath.

24. The method of claim 22, wherein a plurality of magazines are stacked within the cassette.

25. The method of claim 22, wherein the cassette is configured to hold a single stack of magazines in the lateral direction.

26. The method of claim 25, wherein the cassette is configured to hold two stacks of magazines in the longitudinal direction.

27. The method of claim 22, wherein the cassette further comprises a divider separating a first portion of the cassette and a second portion of the cassette, wherein the divider defines a cooling channel extending between the first portion of the cassette and the second portion of the cassette.

28. The method of claim 22, wherein the cassette is configured to cool to a predetermined temperature, wherein the predetermined temperature is a temperature wherein structural relaxation within the plurality of glass articles is substantially reduced, in about less than 30 minutes.

29. The method of claim 22, wherein the cassette further comprises a horizontal cross member configured to vertically space at least two magazines from each other so as to define a horizontal channel extending therebetween.

* * * * *

UNITED STATES PATENT AND TRADEMARK OFFICE
CERTIFICATE OF CORRECTION

PATENT NO. : 11,014,849 B2  
APPLICATION NO. : 15/824582  
DATED : May 25, 2021  
INVENTOR(S) : Michael David Harris et al.

Page 1 of 1

It is certified that error appears in the above-identified patent and that said Letters Patent is hereby corrected as shown below:

In the Claims

In Column 28, Line 39, Claim 22, delete "side-by side" and insert -- side-by-side --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*